US008930532B2

(12) United States Patent
Kagitani

(10) Patent No.: US 8,930,532 B2
(45) Date of Patent: Jan. 6, 2015

(54) SESSION MANAGEMENT IN A THIN CLIENT SYSTEM FOR EFFECTIVE USE OF THE CLIENT ENVIRONMENT

(75) Inventor: Toshiya Kagitani, Tokyo (JP)

(73) Assignee: NEC Corporation, Tokyo (JP)

( * ) Notice: Subject to any disclaimer, the term of this patent is extended or adjusted under 35 U.S.C. 154(b) by 242 days.

(21) Appl. No.: 13/513,746

(22) PCT Filed: Dec. 17, 2010

(86) PCT No.: PCT/JP2010/072758
§ 371 (c)(1),
(2), (4) Date: Jun. 4, 2012

(87) PCT Pub. No.: WO2011/078079
PCT Pub. Date: Jun. 30, 2011

(65) Prior Publication Data
US 2012/0246311 A1    Sep. 27, 2012

(30) Foreign Application Priority Data

Dec. 21, 2009    (JP) ................................ 2009-289048

(51) Int. Cl.
*G06F 15/173*    (2006.01)
*H04L 29/08*    (2006.01)
*H04L 29/06*    (2006.01)

(52) U.S. Cl.
CPC .......... *H04L 67/125* (2013.01); *H04L 65/1073* (2013.01)
USPC ........................................................ 709/224

(58) Field of Classification Search
CPC ... H04L 67/16; H04L 67/2814; H04L 67/303; H04L 65/1073; H04L 67/125
See application file for complete search history.

(56) References Cited

U.S. PATENT DOCUMENTS 6,490,624 B1 * 12/2002 Sampson et al. ............... 709/227
7,913,258 B2 * 3/2011 Konno et al. .................. 718/102

(Continued)

FOREIGN PATENT DOCUMENTS

JP    2006-091954    4/2006
JP    2006-119798    5/2006

(Continued)

OTHER PUBLICATIONS

International Search Report, PCT/JP2010/072758, Mar. 15, 2011.

*Primary Examiner* — Joseph E Avellino
*Assistant Examiner* — Binod J Kunwar
(74) *Attorney, Agent, or Firm* — Young & Thompson

(57) ABSTRACT

A session management system including a client environment providing server, a plurality of terminals, and a session management server, wherein the session management server includes a session monitoring unit which monitors use end time of the client environment, a client environment management unit which makes a log-out request for the execution of log-out processing of a predetermined client environment to the client environment providing server, and a state of use checking unit which checks a state of use of each the client environment, wherein the session monitoring unit notifying a request for stopping use of the client environment to the state of use checking unit when the use end time of the client environment coincides with current time, and the client environment management unit, when the client environment is in use, transmitting to the client environment providing server a log-out request of the client environment.

11 Claims, 24 Drawing Sheets

(56) References Cited

U.S. PATENT DOCUMENTS

| | | |
|---|---|---|
| 8,271,632 B2* | 9/2012 | Kobayashi et al. ............ 709/223 |
| 8,316,133 B2* | 11/2012 | Koshiba ........................ 709/227 |
| 2007/0294414 A1 | 12/2007 | Koshiba |
| 2008/0263217 A1 | 10/2008 | Kimizuka et al. |
| 2009/0006850 A1* | 1/2009 | Birger et al. .................. 713/169 |
| 2009/0150562 A1* | 6/2009 | Kim et al. ..................... 709/238 |
| 2009/0240796 A1* | 9/2009 | Yokoyama et al. ............ 709/223 |

FOREIGN PATENT DOCUMENTS

| | | |
|---|---|---|
| JP | 2006119798 A * | 5/2006 |
| JP | 2007-156588 | 6/2007 |
| JP | 2007-293905 | 11/2007 |
| JP | 2007-334686 | 12/2007 |
| JP | 2008-140306 | 6/2008 |
| WO | WO 2009/069655 | 6/2009 |

* cited by examiner

FIG. 2

CONNECTION DESTINATION SETTING TABLE 31

| USER INFORMATION STORAGE UNIT | CLIENT ENVIRONMENT INFORMATION STORAGE UNIT | PERIOD OF USE INFORMATION STORAGE UNIT | |
|---|---|---|---|
| | | USE START TIME | USE END TIME |
| USER 1 | CLIENT ENVIRONMENT 41-1 (IP ADDRESS A) | 9:00 | 12:00 |
| USER 2 | CLIENT ENVIRONMENT 41-1 (IP ADDRESS A) | 13:00 | 15:00 |
| USER 3 | CLIENT ENVIRONMENT 41-1 (IP ADDRESS A) | 16:00 | 19:00 |

FIG. 5  SESSION MANAGEMENT SYSTEM 100

FIG. 15

CONNECTION DESTINATION SETTING TABLE 31

| USER INFORMATION STORAGE UNIT | CLIENT ENVIRONMENT INFORMATION STORAGE UNIT | PERIOD OF USE INFORMATION STORAGE UNIT | | |
|---|---|---|---|---|
| | | USE START TIME | USE END TIME | EXTENDABLE TIME |
| USER 1 | CLIENT ENVIRONMENT 41-1 (IP ADDRESS A) | 9:00 | 15:00 | 10 MINUTES |
| USER 2 | CLIENT ENVIRONMENT 41-1 (IP ADDRESS A) | 15:00 | 17:00 | NOT EXTENDABLE |

FIG. 21

CONNECTION DESTINATION SETTING TABLE 31

| USER INFORMATION STORAGE UNIT | CLIENT ENVIRONMENT INFORMATION STORAGE UNIT | PERIOD OF USE INFORMATION STORAGE UNIT | | |
|---|---|---|---|---|
| | | USE START TIME | USE END TIME | EXTENDABLE TIME |
| USER 1 | CLIENT ENVIRONMENT 41-1 (IP ADDRESS A) | 9:00 | 15:10 | 10 MINUTES |
| USER 2 | CLIENT ENVIRONMENT 41-1 (IP ADDRESS A) | 15:10 | 17:00 | NOT EXTENDABLE |

32 — USER INFORMATION STORAGE UNIT
33 — CLIENT ENVIRONMENT INFORMATION STORAGE UNIT
34 — PERIOD OF USE INFORMATION STORAGE UNIT

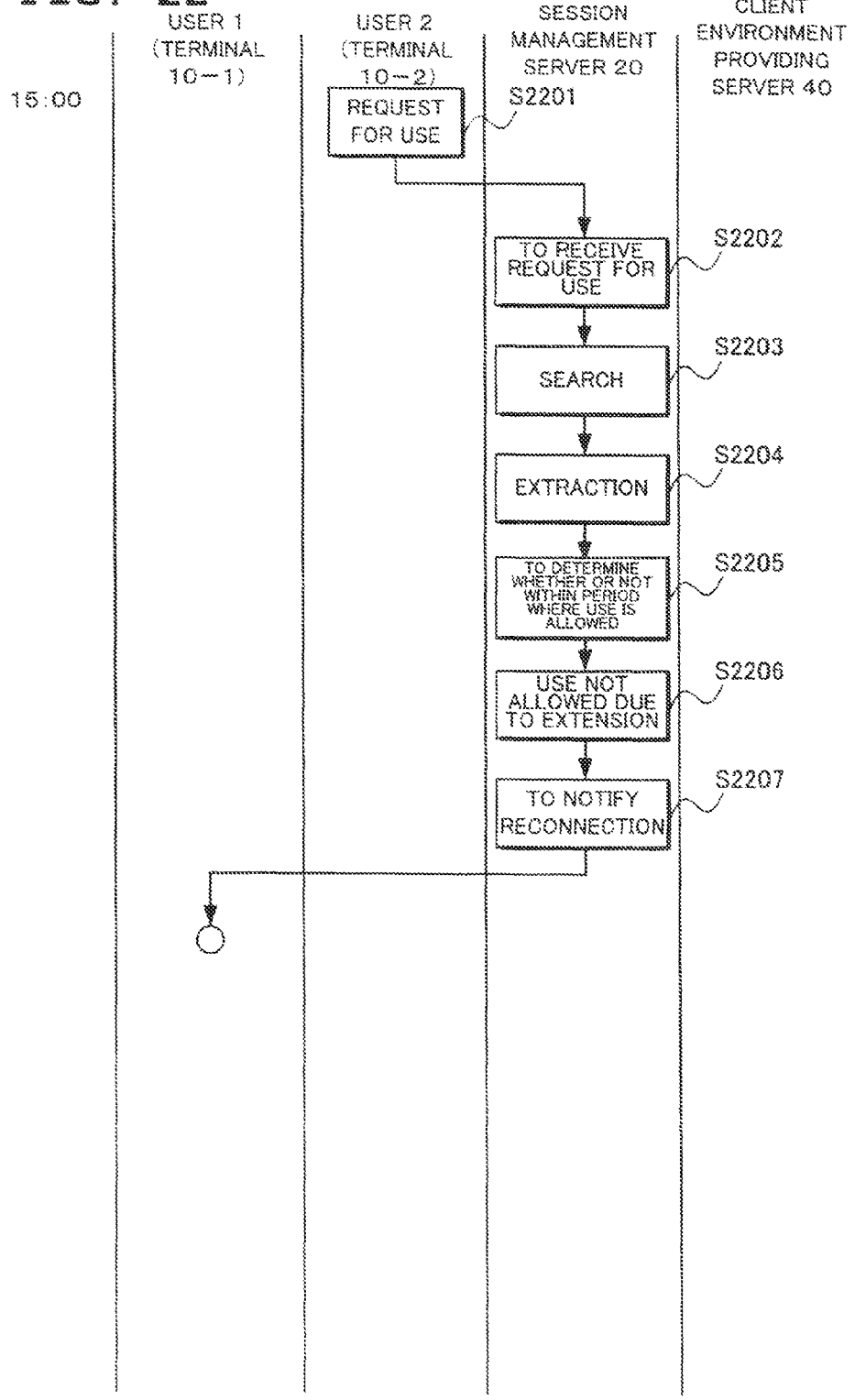

SESSION MANAGEMENT IN A THIN CLIENT SYSTEM FOR EFFECTIVE USE OF THE CLIENT ENVIRONMENT

TECHNICAL FIELD

The present invention relates to session management in a thin client system and, more particularly, a session management system, a session management device, a session management method and a session management program for effective use of the same client environment by a plurality of users.

BACKGROUND ART

In recent years, thin client systems have been drawing attention in which client environments are aggregated on a server in terms of security. As shown in Patent Literature 1, there exists among thin client systems a session management system which with a client environment, a user and a user terminal correlated, sets and manages which user is allowed to use which client environment from which terminal on a server side in the lump.

As related art, Patent Literature 2 discloses a remote connection system. The technique recited in the Patent Literature 2 is to generate a virtual client environment based on a use time set on a user basis and after confirming that the environment generated is no longer used by a user after a lapse of the use time, release resources of the generated virtual client environment. This enables effective use of server resources without wastefully consuming the same. The user is also enabled to spontaneously use a client environment because his/her own client environment is prepared before the use time starts.

Patent Literature 1: 2007-334686
Patent Literature 2: 2006-091954
Patent Literature 3: 2007-156588
Patent Literature 4: 2007-293905

While in the session management system recited in the Patent Literature 1, since a virtual client environment can be unlimitedly generated as far as resources permit, no client environments used by users overlap with each other, in an actual thin client system and the like, there is a case where limited resources should be effectively used by a plurality of users for a physical reason or other.

In a case where the same client environment is used by a plurality of users, the technique recited in the Patent literature 1 has a problem that a certain client environment being used by a user first is not available for a user who wants to use it later. Another problem is that because a client environment is used at a remote place, it is difficult to coordinate use time or a period of use among users.

The technique recited in the Patent Literature 2 also has the same problem as that of the Patent literature 1 because it is premised on that release of a virtual client environment is executed on condition that no user is using the client environment in question.

OBJECT OF THE INVENTION

An object of the present invention is to solve the above-described problems and provide a session management system, a session management device, a session management method and a session management program which enable effective use of the same client environment by a plurality of users.

SUMMARY

According to a first exemplary aspect of the invention, a session management system including a client environment providing server including at least one client environment, a plurality of terminals, and a session management server which manages a session between the client environment and the terminals, wherein
  the session management server comprising:
  a session monitoring unit which monitors use end time of the client environment;
  a client environment management unit which makes a log-out request for the execution of log-out processing of a predetermined client environment to the client environment providing server; and
  a state of use checking unit which checks a state of use of each the client environment, wherein
  the session monitoring unit notifying a request for stopping use of the client environment to the state of use checking unit when the use end time of the client environment coincides with current time, and
  the client environment management unit, when the client environment is in use, transmitting to the client environment providing server a log-out request for the execution of the log-out processing of the client environment.
  a session management server of a session management system including a client environment providing server including at least one client environment, a plurality of terminals, and a session management server which manages a session between the client environment and the terminals, comprising:
  a session monitoring unit which monitors use end time of the client environment;
  a client environment management unit which makes a log-out request for the execution of log-out processing of a predetermined client environment to the client environment providing server; and
  a state of use checking unit which checks a state of use of each the client environment, wherein
  the session monitoring unit notifying a request for stopping use of the client environment to the state of use checking unit when the use end time of the client environment coincides with current time, and
  the client environment management unit, when the client environment is in use, transmitting to the client environment providing server the log-out request for the execution of the log-out processing of the client environment.

According to a second exemplary aspect of the invention, a session management method of a session management system including a client environment providing server including at least one client environment, a plurality of terminals, and a session management server which manages a session between the client environment and the terminals, wherein
  the session management server including:
  a session monitoring step of monitoring use end time of the client environment;
  a client environment management step of making a log-out request for the execution of log-out processing of a predetermined client environment to the client environment providing server; and
  a state of use checking step of checking a state of use of each the client environment, wherein
  at the session monitoring step, a request for stopping use of the client environment is notified to the state of use checking step when the use end time of the client environment coincides with current time, and at the client environment management step, when the client environment is in use, a log-out request for the execution of the log-out processing of the client environment is transmitted to the client environment providing server.

According to a third exemplary aspect of the invention, a session management program which causes a session management server of a session management system including a client environment providing server including at least one client environment, a plurality of 15 terminals, and the session management server which manages a session between the client environment and the terminals to execute:

a processing of monitoring use end time of the client environment;

a processing of making a log-out request for the execution of log-out processing of a predetermined client environment to the client environment providing server; and a processing of checking a state of use of each the client environment, wherein in the monitoring processing, a request for stopping use of the client environment is notified to the state of use checking processing when the use end time of the client environment coincides with current time, and in the processing of making the log-out request, when the client environment is in use, the log-out request for the execution of the log-out processing of the client environment is transmitted to the client environment providing server.

The present invention enables the same client environment to be used by a plurality of users effectively.

BRIEF DESCRIPTION OF THE DRAWINGS

FIG. 2 is a diagram showing an example of a structure of a connection destination setting table according to the first exemplary embodiment;

FIG. 15 is a diagram showing an example of a structure of a connection destination setting table according to the second exemplary embodiment;

FIG. 21 is a diagram showing a structure of the connection destination setting table after a period of use is extended according to the second example;

FIG. 22 is a sequence diagram showing operation of the session management system according to the second example;

EXEMPLARY EMBODIMENT

Next, exemplary embodiments of the present invention will be detailed with reference to the drawings.

First Exemplary Embodiment

First, a first exemplary embodiment of the present invention will be detailed with reference to the drawings.

Figure 1:
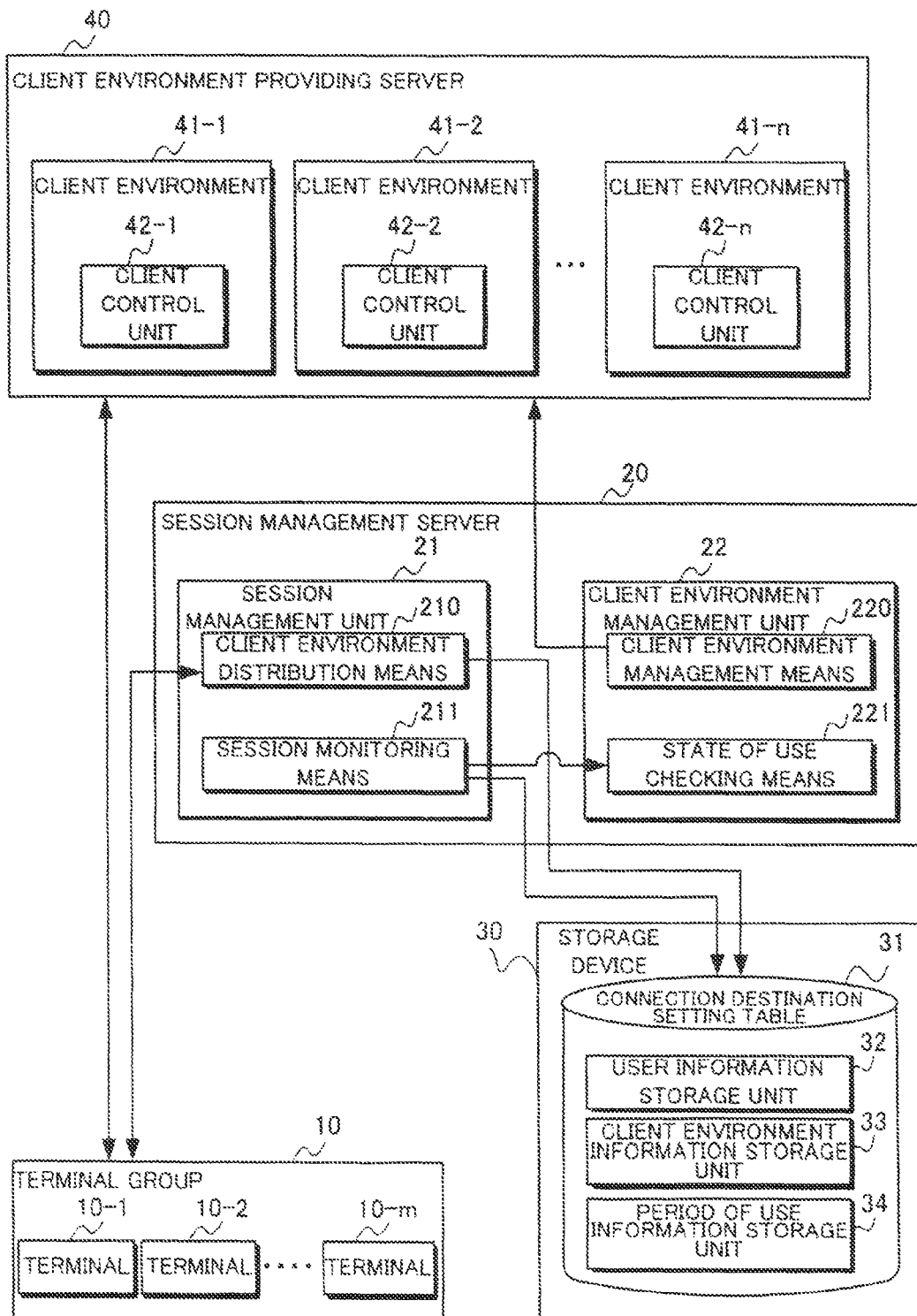
FIG. 1 is a block diagram showing a structure of a session management system according to a first exemplary embodiment of the present invention.

FIG. 1 is a block diagram showing a structure of a session management system 100 according to the first exemplary embodiment of the present invention. With reference to FIG. 1, the session management system 100 of the present exemplary embodiment comprises a terminal group 10 including at least one terminal, a session management server 20 which distributes an appropriate client environment according to a user's request, a storage device 30 which holds information to be used by the session management server 20, and a client environment providing server 40 which has a client environment to which a user connects.

The client environment providing server 40 comprises at least one client terminal (client environments 41-1 to 41-n). n here represents an arbitrary natural number.

The client environments 41-1 to 41-n each represent a client environment which includes an OS (Operating System), an application or the like and to which a user connects.

The client environments 41-1 to 41-n comprise client control units 42-1 to 42-n, respectively, which execute log-out of a client environment.

The client control units 42-1 to 42-n have a function of executing log-out processing (forced log-out) of a user using the client environments 41-1 to 41-n.

The terminal group 10 comprises a plurality of terminals (terminals 10-1 to 10-m) to be used by a user to connect to the client environment 41-n. m here represents an arbitrary natural number not less than 2.

The session management server 20 comprises a session management unit 21 which manages a session between a client environment and a terminal, and a client environment management unit 22 which manages a state of use or the like of a client environment.

The session management unit 21 includes a client environment distribution means 210 which refers to a connection destination setting table 31 of the storage device 30 according to a user's request to distribute an appropriate client environment to the user, and a session monitoring means 211 which monitors a use end time of each client environment.

The client environment distribution means 210 has a function of referring to the connection destination setting table 31 with user identification information included in a request for use sent from a terminal 10-*m* as a key to search for a client environment set for the user in question (hereinafter referred to as a registered client environment). Although user identification information here is assumed to be set when the terminal 10-*m* sends a request for use to the session management server 20, it may, not limited to the same, be a log-in name used at the time of log-in to the terminal 10-*m*, for example.

The client environment distribution unit means has a function of comparing current time and a period of use set as a period in which the user in question is allowed to use the registered client environment in question to determine whether the registered client environment falls within the period where its use is allowed.

The client environment distribution means 210 also has a function of transmitting, to the terminal 10-*m* having made a request for use, a result of the request for use. When there exists a registered client environment falling within a period where its use is allowed (hereinafter referred to as a usable client environment), the client environment distribution unit means notifies the terminal 10-*m* of information about the usable client environment in question (IP address) and when the same fails to exist, notifies the terminal 10-*m* that no usable client information exists.

The session monitoring means 211 has a function of monitoring use end time of each client environment. The session monitoring means 211 periodically refers to the connection destination setting table 31 to compare current time and use end time and when the client environment 41-*n* exists whose use end time coincides with the current time, notifies the client environment management unit 22 of a request for stopping use of the client environment 41-*n*.

The client environment management unit 22 includes a client environment management means 220 which manages the client environments 41-1 to 41-*n* and a state of use checking means 221 which checks a state of use of the client environments 41-1 to 41-*n*.

The client environment management means 220 has a function of executing processing of preventing a user from using a client environment according to a request from the session management unit 21. When the client environment 41-*n* relevant to the use stop request from the session management unit 21 is in use, the client environment management means 220 transmits, to the client environment providing server 40, a requested log-out request for making a user who is logging in the client environment 41-*n* log out.

The state of use checking means 221 has a function of checking a state of use of the client environment 41-*n*. Although since a specific means for checking a state of use is well known to those skilled in the technical field of the present invention and a method of the same itself is not directly related to the present invention, no detailed description will be made of the same, such a method of using a connection state management table as disclosed in the Patent Literature 1 can be used, for example.

The storage device 30 comprises the connection destination setting table 31. The connection destination setting table 31, which comprises a user information storage unit 32, a client environment information storage unit 33 and a period of use information storage unit 34, stores a client environment, use start time and use end time so as to be correlated with each user as shown in FIG. 2.

Information stored in the period of use information storage unit 34 may be time as shown in FIG. 2 or a fixed period such as from 8 o'clock of Apr. 1, 2000 to 19 o'clock of Mar. 31, 2001. The connection destination setting table 31 may be provided in the session management server 20.

(Description of Operation of the First Exemplary Embodiment)

Next, operation of the present exemplary embodiment will be detailed with reference to the drawings.

(Description of Operation of Starting Use of Client Environment)

Figure 3:
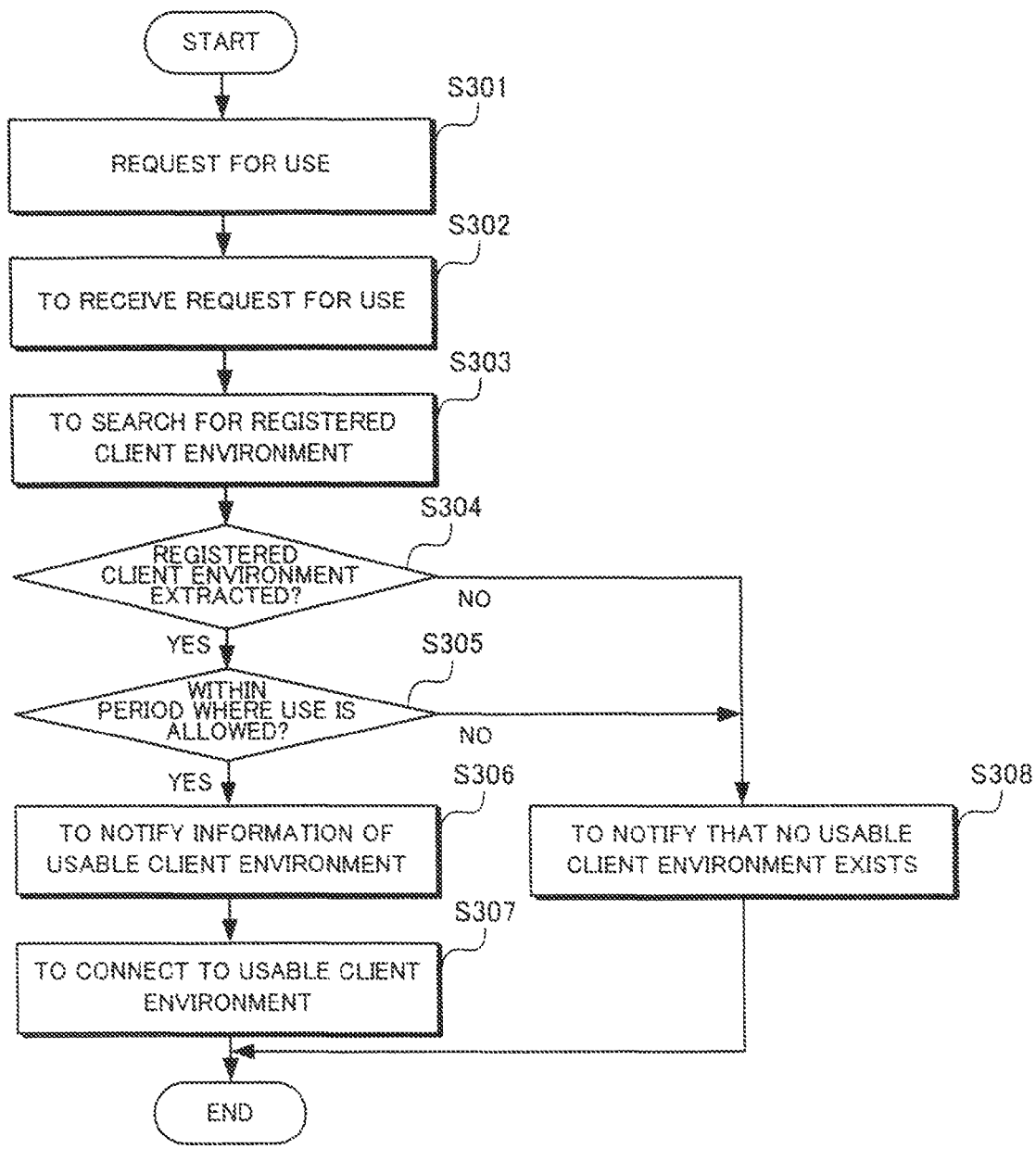
FIG. 3 is a flow chart showing operation of starting use of a client environment according to the first exemplary embodiment.

Detailed description will be made of operation of starting use of a client environment in the session management system 100 according to the present exemplary embodiment with reference to FIG. 3. FIG. 3 is a flow chart showing the operation of staring use of a client environment in the session management system 100 according to the present exemplary embodiment.

First, when an arbitrary user executes operation of requesting use of a client environment by the terminal 10-*m*, the terminal 10-*m* transmits a request for use of the client environment to the session management server 20 (Step S301). The request for use in question includes user identification information of the user in question.

When receiving the request for use in question (Step S302), the session management server 20 transfers the request for use to the session management unit 21. In the session management unit 21 having received the request for use, the client environment distribution means 210 refers to the connection destination setting table 31 with user identification information included in the request for use as a key to search for a registered client environment set for the user in question (Step S303).

When a registered client environment is extracted as a result of the search ("YES" at Step S304), the client environment distribution means 210 compares current time and a period of use set as a period in which the user in question is allowed to use the registered client environment to determine whether the registered client environment falls within the period where its use is allowed (Step S305). When a plurality of registered client environments are extracted, execute the processing of Step S305 with respect to all the registered client environments.

When there exists a usable client environment as a result of the processing ("YES" at Step S305), the client environment distribution means 210 notifies the terminal 10-*m* of information (IP address) of the usable client environment (Step S306).

When there exist a plurality of usable client environments, the client environment distribution means 210 determines an arbitrary one of them. Not limited to this, it may be possible, for example, to transmit the information of all the usable client environments to the terminal 10-*m*, so that the terminal 10-*m* selects an arbitrary one of them. In this case, it is apparent that the selection result obtained by the terminal 10-*m* should be notified to the session management server 20.

Subsequently, the terminal 10-*m* having received the information about the usable client environment connects to the client environment in question to start using the same (Step S307).

When there exists no usable client environment ("NO" at Step S304, "NO" at Step S305), the client environment distribution means 210 notifies the terminal 10-*m* that no usable client environment exists (Step S308).

(Description of Operation of Ending Use of Client Environment)

Figure 4:
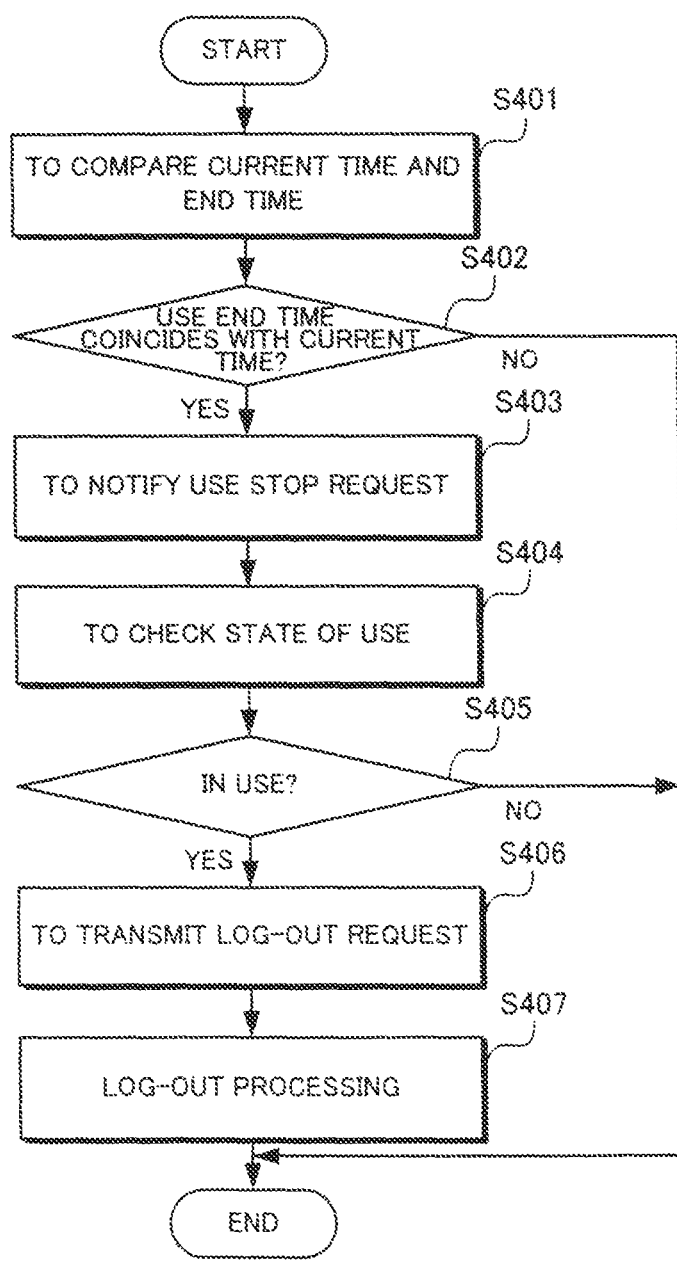
FIG. 4 is a flow chart showing operation of ending use of a client environment according to the first exemplary embodiment.

Next, detailed description will be made of operation of ending use of a client environment of the session management system 100 according to the present exemplary embodiment with reference to FIG. 4. FIG. 4 is a flow chart showing operation of ending use of the client environment 41-*n* of the session management system 100 according to the present exemplary embodiment. Since operation to be executed when a user ends the use by himself/herself at arbitrary time is self-evident, description will be here made of operation of ending use based a lapse of use end time.

In the session management server 20, the session monitoring means 211 periodically refers to the connection destination setting table 31 to compare current time and use end time (Step S401).

Then, when the client environment 41-*n* exists whose use end time coincides with the current time ("YES" at Step S402), the session monitoring means 211 requests the client environment management unit 22 to stop use of the client environment 41-*n* (Step S403).

In the client environment management unit 22 having received the use stop request, the state of use checking means 221 checks a state of use of the client environment 41-*n* (Step S404).

Then, when the client environment 41-*n* is in use ("YES" at Step S405), the client environment management means 220 transmits a log-out request to the client environment providing server 40 (Step S406).

Next, the client environment providing server 40 having received the log-out request transfers the log-out request to the client environment 41-*n*, so that in the client environment 41-*n* having received the log-out request, the client control unit 42-*n* executes log-out processing of the user (forced log-out) (Step S407).

First Example

Next, operation of the present exemplary embodiment will be described with respect to a specific example.
(Description of Structure)

Figure 5:
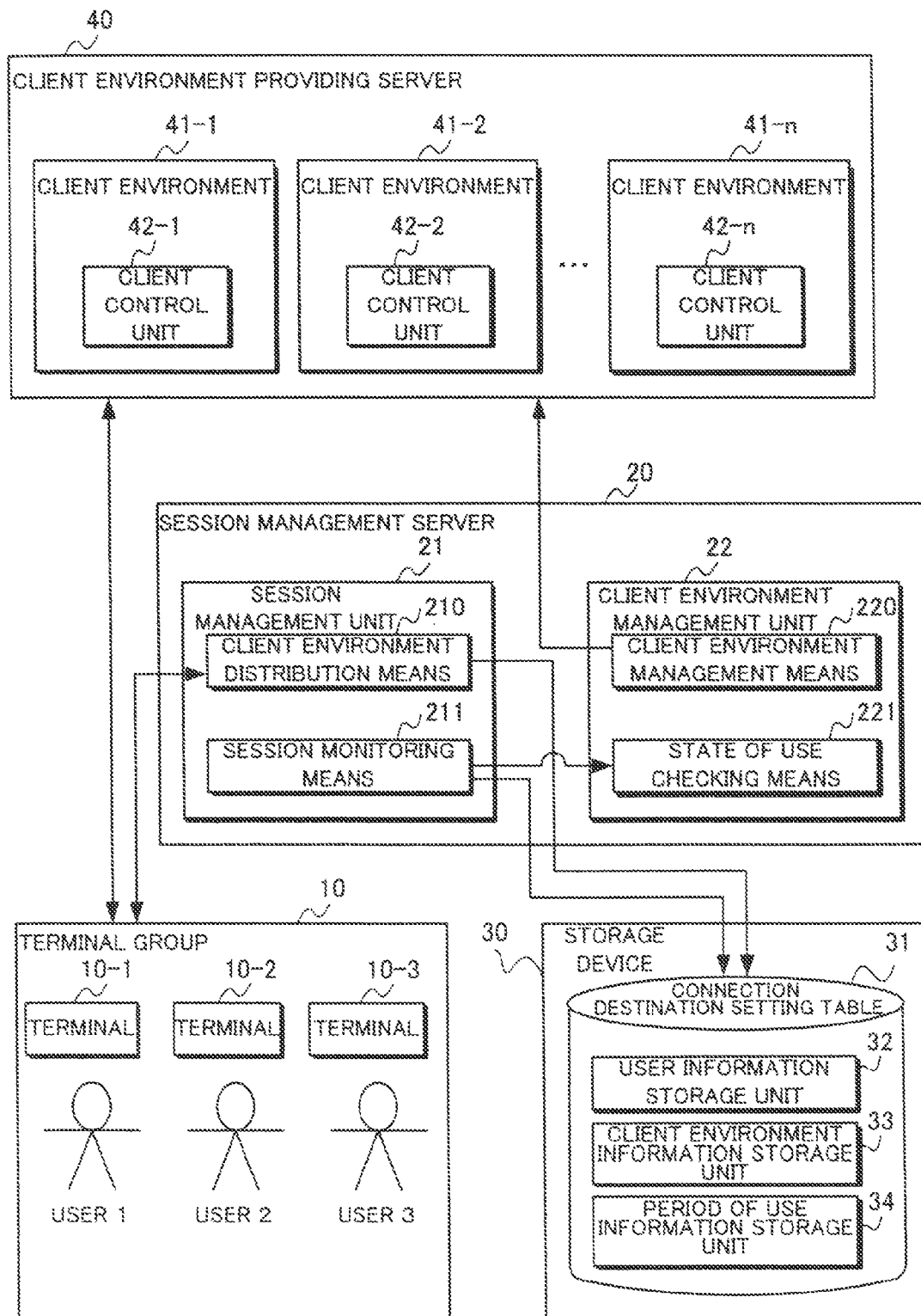
FIG. 5 is a block diagram showing a structure of the session management system according to the first example of the present invention.

FIG. 5 is a block diagram showing a structure of the session management system 100 according to the present example. With reference to FIG. 5, in the present example, a user 1 uses a terminal 10-1, a user 2 uses a terminal 10-2 and a user 3 uses a terminal 10-3.

Used in the present example is the connection destination setting table 31 shown in FIG. 2. With reference to FIG. 2, the user 1 is allowed to use the client environment 41-1 from 9:00 to 12:00 o'clock, the user 2 is allowed to use the client environment 41-1 from 13:00 to 15:00 o'clock and the user 3 is allowed to use the client environment 41-1 from 16:00 to 19:00 o'clock.
(Description of Operation)

Next, operation of the present example will be detailed with reference to FIG. 6 through FIG. 13. FIG. 6 through FIG. 12 are sequence diagrams showing operation of the session management system 100 according to the present example and FIG. 13 is a sequence diagram showing a state of use of the client environment 41-1 according to the present example.

Figure 6:
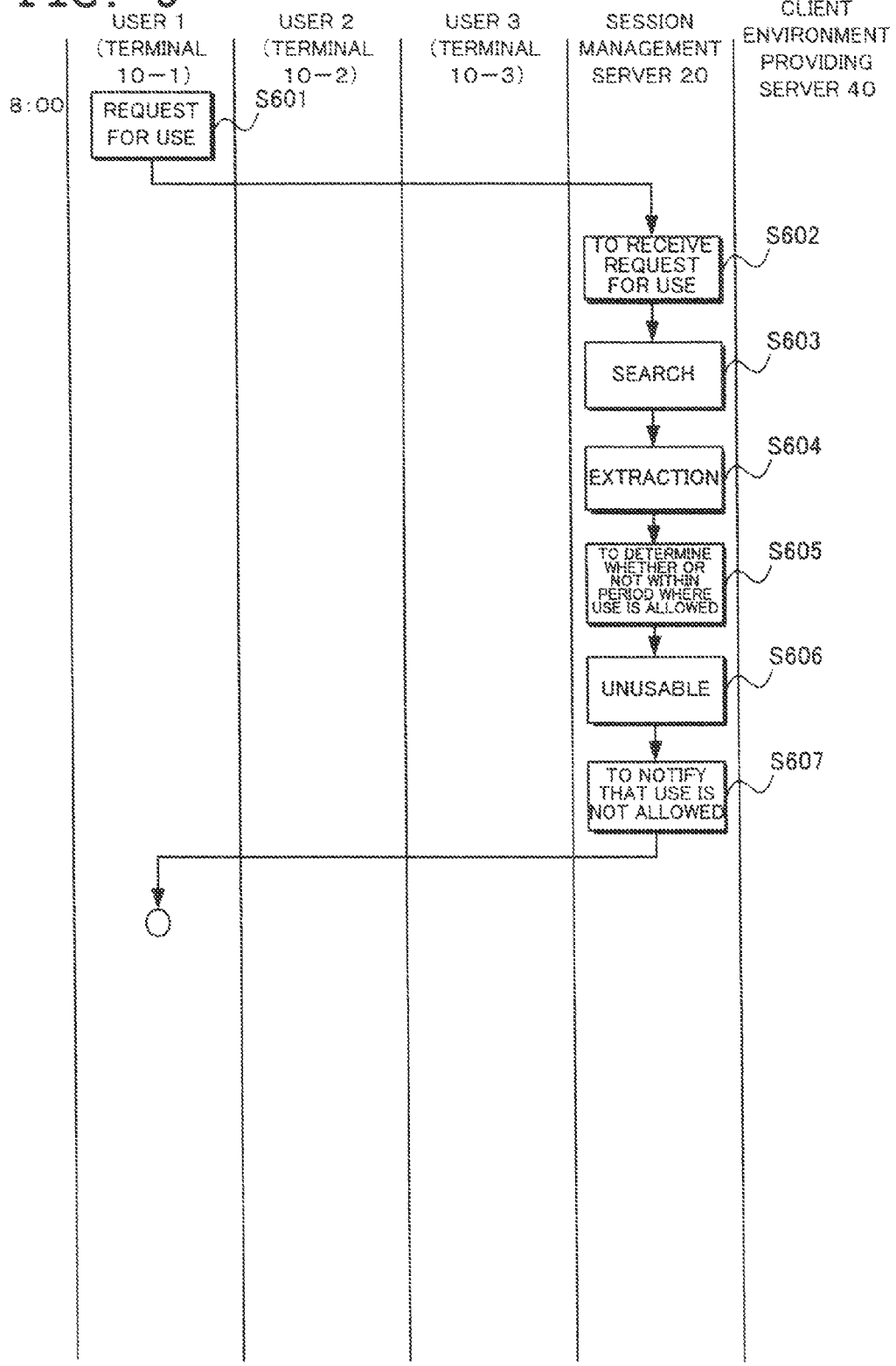
FIG. 6 is a flow chart showing operation of the session management system according to the first example.

First, with reference to FIG. 6, when the user 1 executes client environment use requesting operation by the terminal 10-1 at 8:00, the terminal 10-1 transmits a client environment use request to the session management server 20 (Step S601).

Upon receiving the use request (Step S602), the session management server 20 transfers the use request to the session management unit 21. In the session management unit 21 having received the use request, the client environment distribution means 210 refers to the connection destination setting table 31 with user identification information included in the use request as a key to search for a registered client environment set for the user 1 (Step S603). As a result, the client environment 41-1 is extracted (Step S604).

Subsequently, the client environment distribution means 210 compares current time and a period of use set as a period in which the user 1 is allowed to use the client environment 41-1 to determine whether the client environment 41-1 falls within the period where its use is allowed (Step S605). Since in the present example, the current time is 8:00 o'clock and the period of use stored is from 9:00 to 12:00, the client environment distribution means 210 determines that the user 1 is not allowed to use the client environment 41-1 (Step S606).

Subsequently, the client environment distribution means 210 notifies the terminal 10-1 that no usable client environment exists (Step S607).

Figure 7:
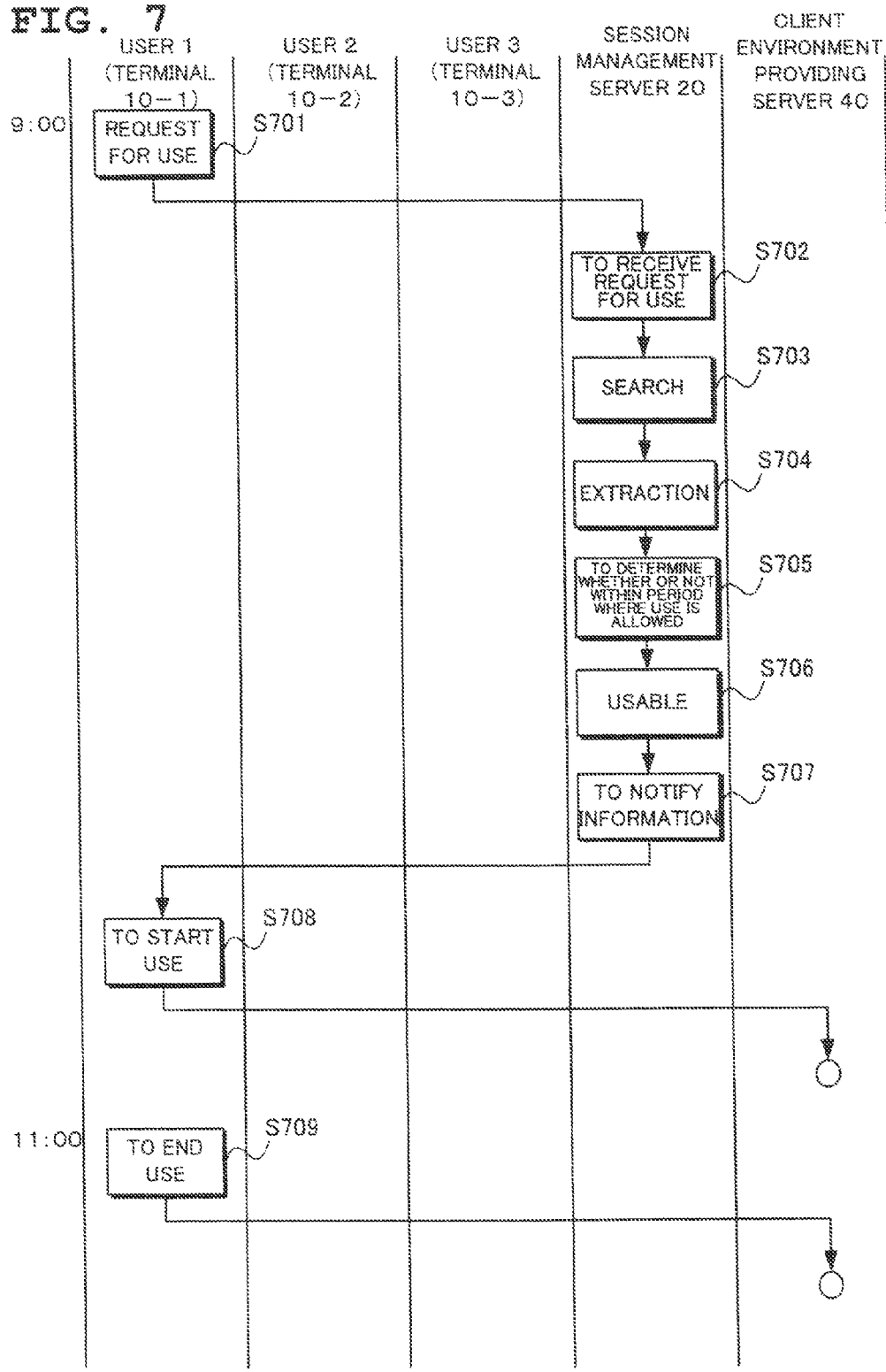
FIG. 7 is a flow chart showing operation of the session management system according to the first example.

Next, with reference to FIG. 7, when the user 1 executes client environment use requesting operation by the terminal 10-1 at 9:00, the terminal 10-1 transmits a client environment use request to the session management server 20 (Step S701).

Upon receiving the use request (Step S702), the session management server 20 transfers the use request to the session management unit 21. In the session management unit 21 having received the use request, first, the client environment distribution means 210 refers to the connection destination setting table 31 with user identification information included in the use request as a key to search for a registered client environment set for the user 1 (Step S703). As a result, the client environment 41-1 is extracted (Step S704).

Subsequently, the client environment distribution means 210 compares current time and a period of use set as a period in which the user 1 is allowed to use the client environment 41-1 to determine whether the client environment 41-1 falls within the period where its use is allowed (Step S705). Since in the present example, the current time is 9:00 o'clock and the period of use stored is from 9:00 to 12:00, the client environment distribution means 210 determines that the user 1 is allowed to use the client environment 41-1 (Step S706).

Subsequently, the client environment distribution means 210 notifies the terminal 10-1 of information about the client environment 41-1 (IP address A) (Step S707).

Subsequently, the terminal 10-1 having received the information of the client environment 41-1 connects to the client environment 41-1 based on the information to start use (Step S708). Thus, the user 1 is allowed to use the client environment 41-1.

Then, at 11:00 the user 1 ends the use of the client environment 41-1 (Step S709).

Figure 8:
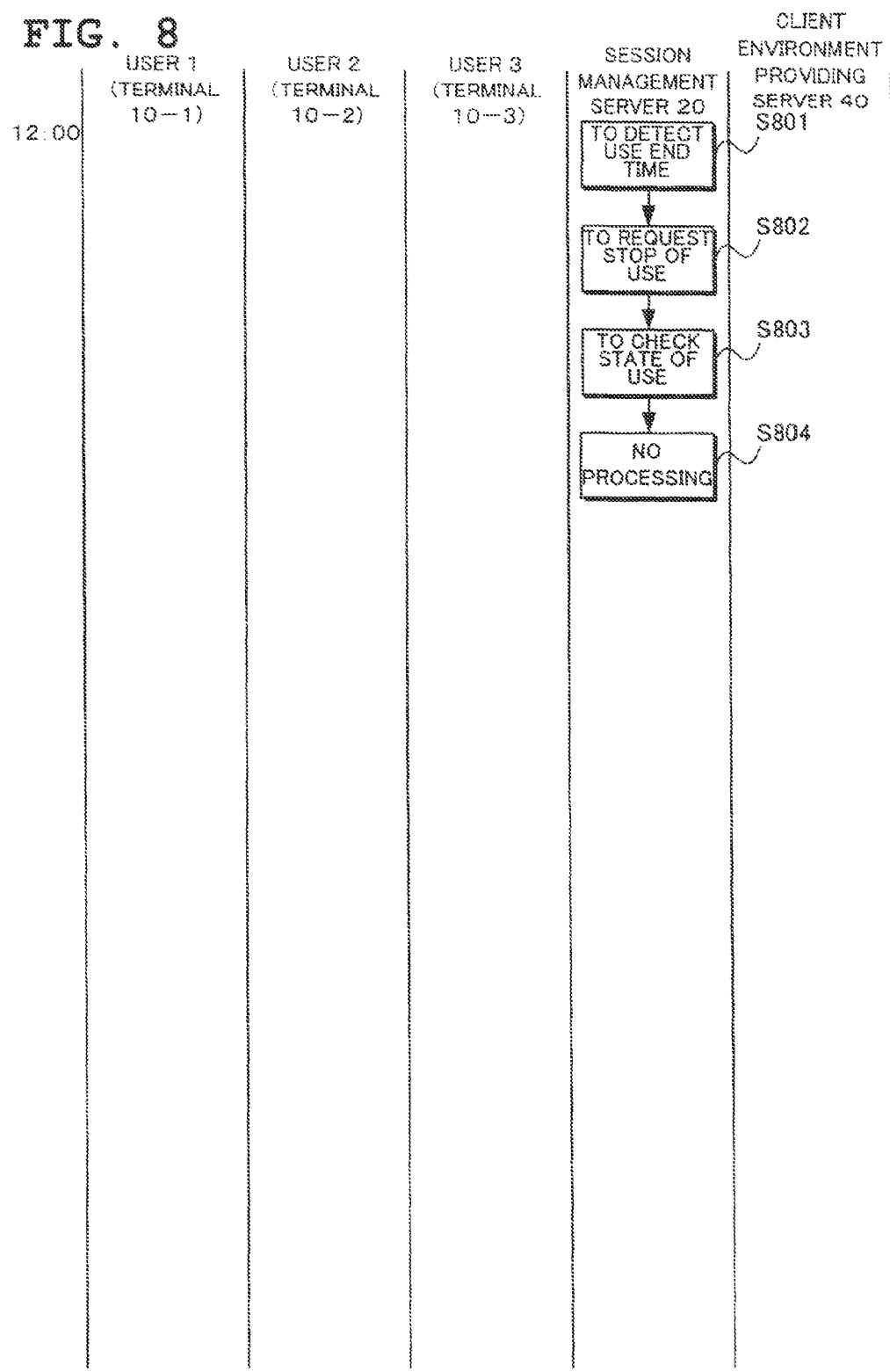
FIG. 8 is a flow chart showing operation of the session management system according to the first example.

Next, with reference to FIG. 8, the session monitoring means 211 periodically comparing current time and use end time detects at 12:00 coincidence of the current time with the use end time of the client environment 41-1 of the user 1 (Step S801) to notify the client environment management unit 22 of a request for stopping use of the client environment 41-1 (Step S802).

In the client environment management unit 22 having received the use stop request, the state of use checking means 221 checks a state of use of the client environment 41-1 (Step S803). Since the user 1 logs out at 11:00 and the client environment 41-1 is being used by none at the time point of 12:00, the client environment management unit 22 executes no processing in particular (Step S804).

Figure 9:
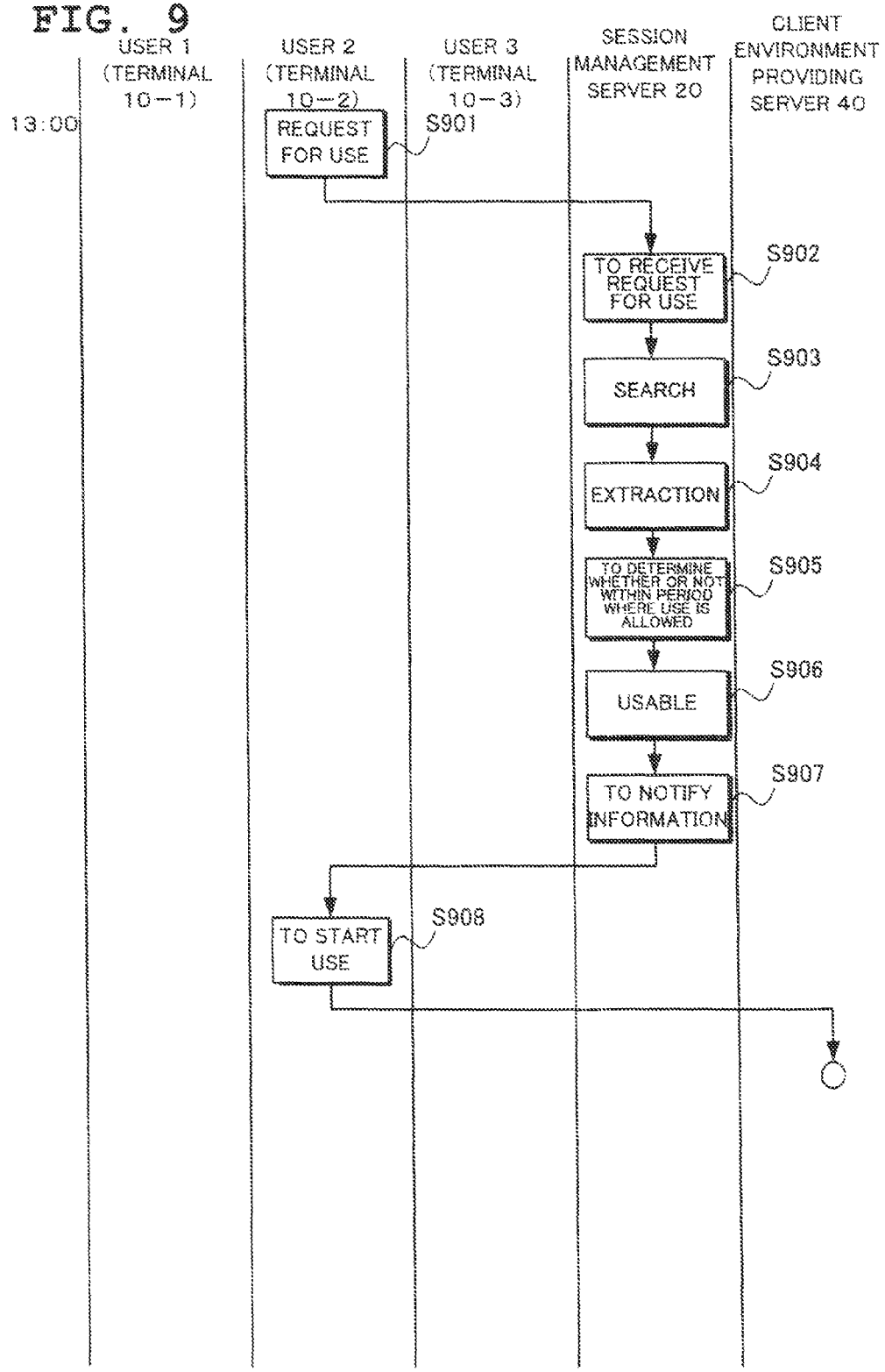
FIG. 9 is a flow chart showing operation of the session management system according to the first example.

Next, with reference to FIG. 9, when the user 2 executes operation of requesting use of a client environment by the terminal 10-2 at 13:00, the terminal 10-2 transmits a request for use of a client environment to the session management server 20 (Step S901).

When receiving the request for use in question (Step S902), the session management server 20 transfers the request for use to the session management unit 21. In the session management unit 21 having received the request for use, first, the client environment distribution means 210 refers to the connection destination setting table 31 with user identification information included in the request for use as a key to search for a registered client environment set for the user 2 (Step S903). As a result, the client environment 41-1 is extracted (Step S904).

Subsequently, the client environment distribution means 210 compares current time and a period of use set as a period in which the user 2 is allowed to use the client environment 41-1 to determine whether the client environment 41-1 falls within the period where its use is allowed (Step S905). Since in the present example, the current time is 13:00 o'clock and the period of use stored is from 13:00 to 15:00, the client environment distribution means 210 determines that the client environment 41-1 is usable (Step S906).

Subsequently, the client environment distribution means 210 transmits information (IP address A) of the client environment 41-1 to the terminal 10-2 (Step S907).

Subsequently, the terminal 10-2 having received the information of the client environment 41-1 connects to the client environment 41-1 based on the information to start use (Step S908). Thus, the user 2 is allowed to use the client environment 41-1.

Figure 10:
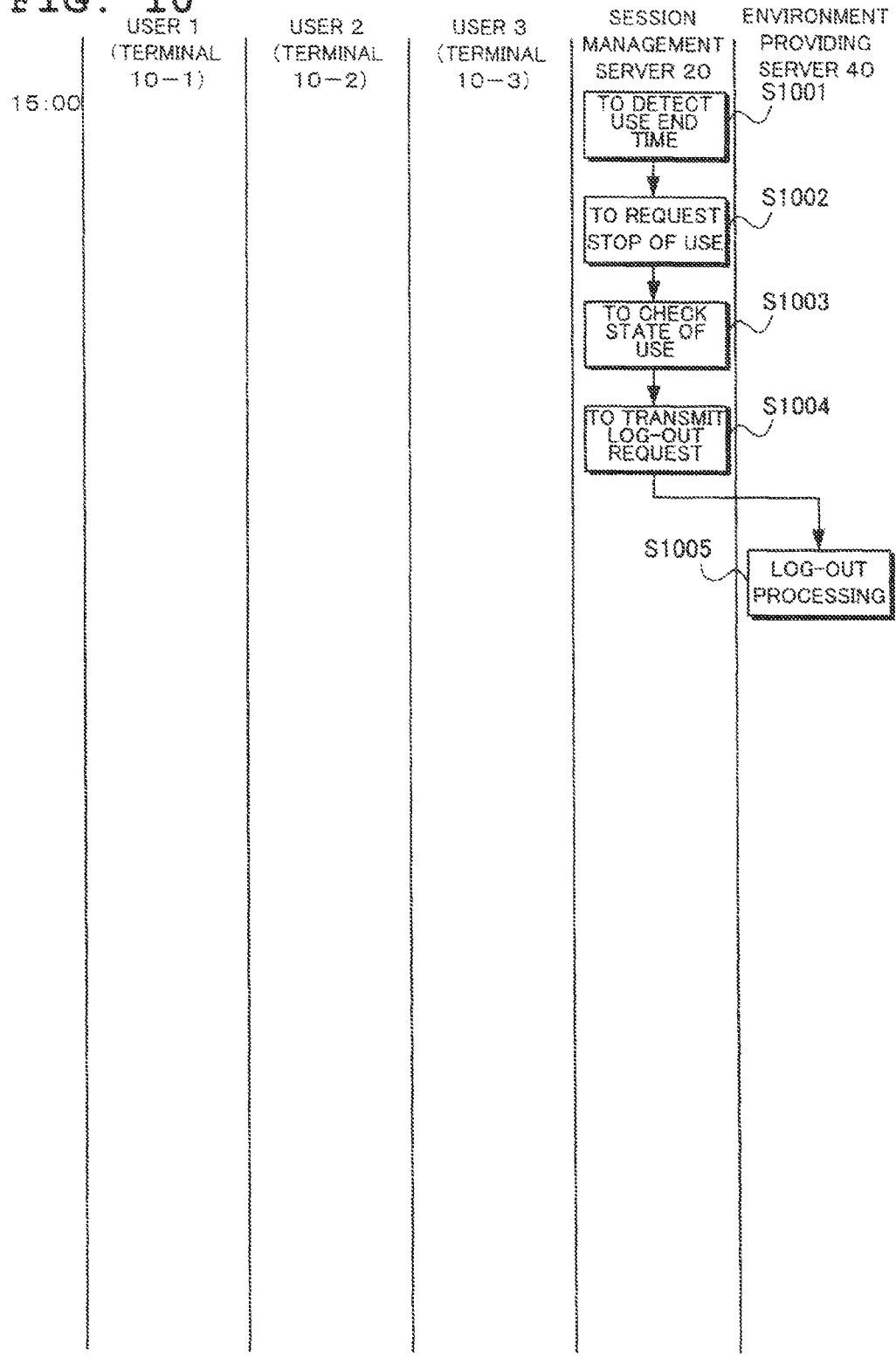
FIG. 10 is a flow chart showing operation of the session management system according to the first example.

Next, with reference to FIG. 10, the session monitoring means 211 periodically comparing current time and use end time detects at 15:00 coincidence of the current time with the use end time of the client environment 41-1 of the user 2 (Step S1001) to notify the client environment management unit 22 of a request for stopping use of the client environment 41-1 (Step S1002).

In the client environment management unit 22 having received the use stop request, the state of use checking means 221 checks a state of use of the client environment 41-1 (Step S1003). Since the client environment 41-1 is currently being used by the user 2, the client environment management means 220 subsequently transmits a request for log-out of the user 2 logging in the client environment 41-1 to the client environment providing server 40 (Step S1004).

Subsequently, in the client environment providing server 40 having received the log-out request, the client control unit 42-1 executes log-out processing (forced log-out) of the user 2 (Step S1005). This prevents the user 2 from using the client environment 41-1.

Figure 11:
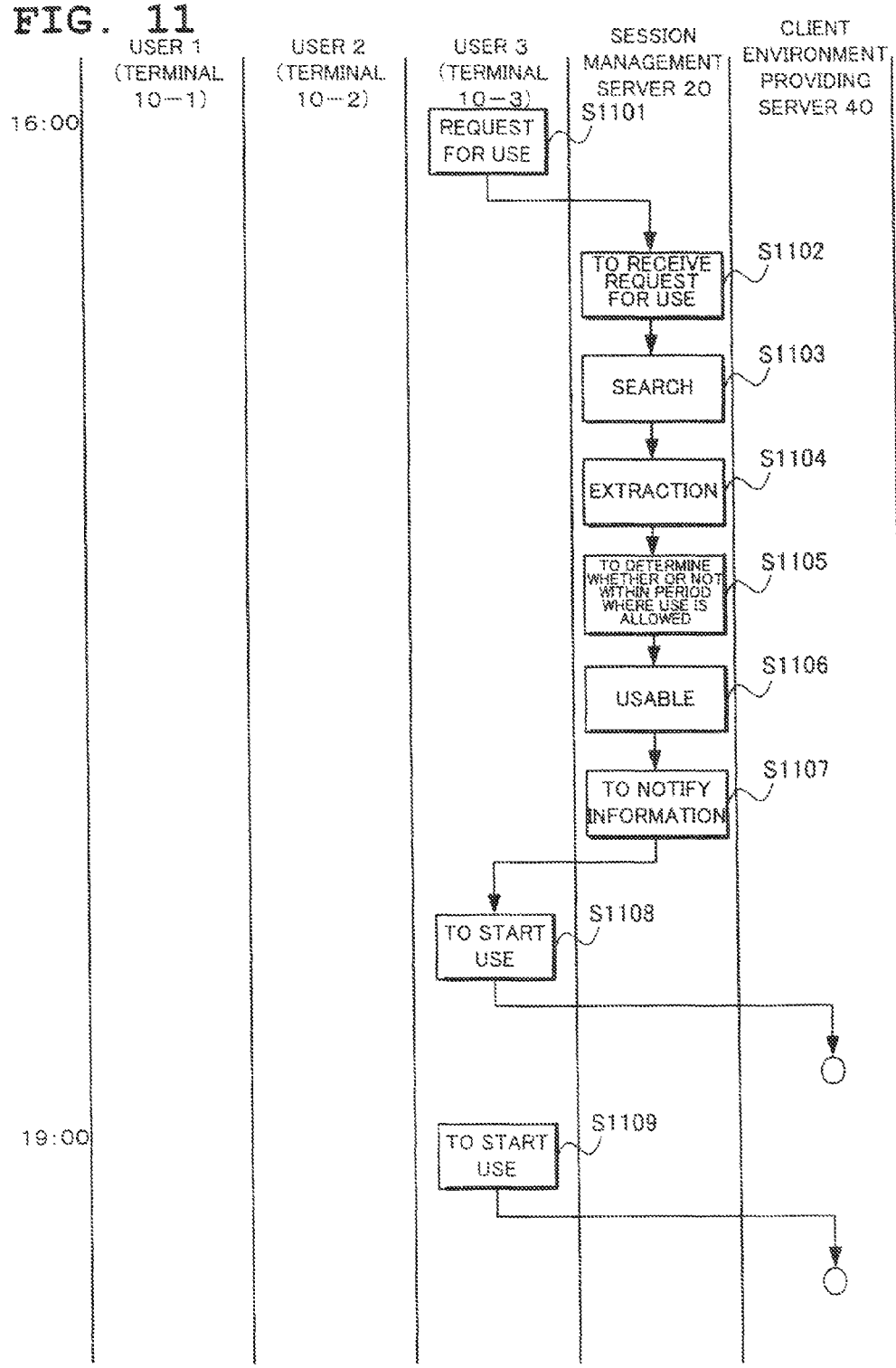
FIG. 11 is a flow chart showing operation of the session management system according to the first example.

Next, with reference to FIG. 11, when the user 3 executes operation of requesting use of a client environment by the terminal 10-3 at 16:00, the terminal 10-3 transmits a request for use of a client environment to the session management server 20 (Step S1101).

When receiving the request for use in question (Step S1102), the session management server 20 transfers the request for use to the session management unit 21. In the session management unit 21 having received the request for use, first, the client environment distribution means 210 refers to the connection destination setting table 31 with user identification information included in the request for use as a key to search for a registered client environment set for the user 3 (Step S1103). As a result, the client environment 41-1 is extracted (Step S1104).

Subsequently, the client environment distribution means 210 compares current time and a period of use set as a period in which the user 3 is allowed to use the client environment 41-1 to determine whether the client environment 41-1 falls within the period where its use is allowed (Step S1105). Since in the present example, the current time is 16:00 o'clock and the period of use stored is from 16:00 to 19:00, the client environment distribution means 210 determines that the client environment 41-1 is usable (Step S1106).

Subsequently, the client environment distribution means 210 transmits information (IP address 41-1) of the client environment 41-1 to the terminal 10-3 (Step S1107).

Subsequently, the terminal 10-3 having received the information of the client environment 41-1 connects to the client environment 41-1 based on the information to start use (Step S1108). Thus, the user 3 is allowed to use the client environment 41-1.

The point at this time point is that since the user 2 is forced to log out from the client environment 41-1 at the time point of 15:00 o'clock, other user is allowed to use the client environment 41-1 after that time point.

Then, the user 3 ends the use of the client environment 41-1 at 19:00 (Step S1109).

Figure 12:
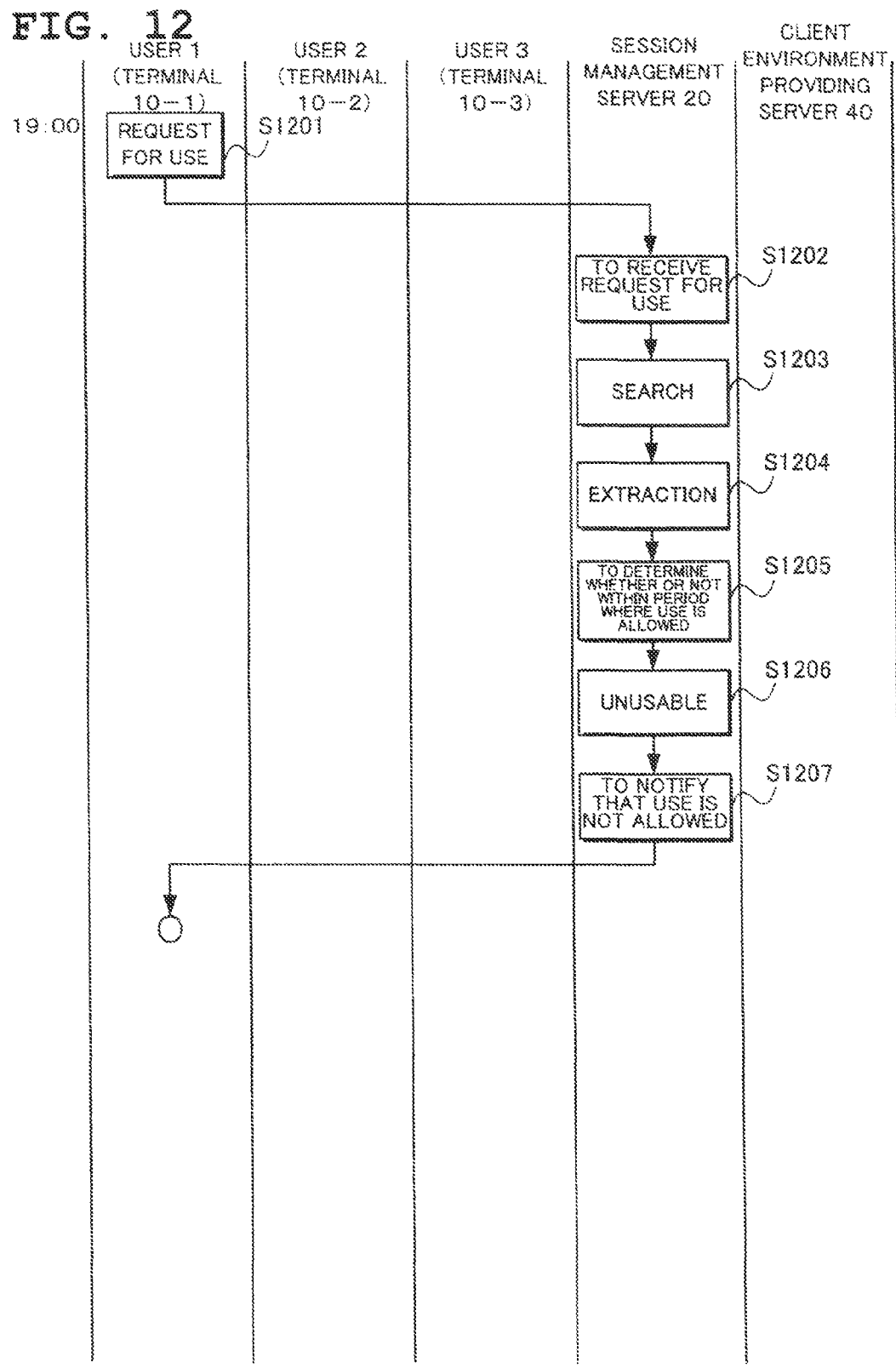
FIG. 12 is a flow chart showing operation of the session management system according to the first example.
Figure 13:
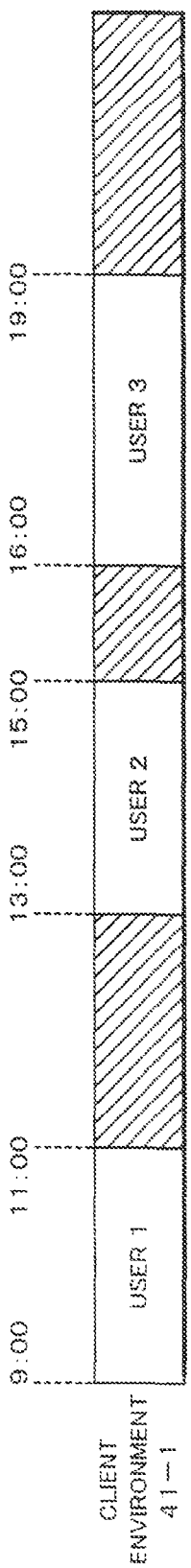
FIG. 13 is a sequence diagram showing a state of use of a client environment according to the first example.

Next, with reference to FIG. 12, when someone not authorized pretends to be the user 1 and executes operation of requesting use of a client environment by the terminal 10-1 at 20:00, the terminal 10-1 transmits a request for use of a client environment to the session management server 20 (Step S1201).

When receiving the request for use in question (Step S1202), the session management server 20 transfers the request for use to the session management unit 21. In the session management unit 21 having received the request for use, first, the client environment distribution means 210 refers to the connection destination setting table 31 with user identification information included in the request for use as a key to search for a registered client environment set for the user 1 (Step S1203). As a result, the client environment 41-1 is extracted (Step S1204).

Subsequently, the client environment distribution means 210 compares current time and a period of use set as a period in which the user 1 is allowed to use the client environment 41-1 to determine whether the client environment 41-1 falls within the period where its use is allowed (Step S1205). Since in the present example, the current time is 20:00 o'clock and the period of use stored is from 9:00 to 12:00, the client environment distribution means 210 determines that the client environment 41-1 is unusable (Step S1206).

Subsequently, the client environment distribution means 210 notifies the terminal 10-1 that no usable client environment exists (Step S1207).

Thus limiting use of a client environment during other period than a period where use of the same is allowed improves security as well.

(Effects of the First Exemplary Embodiment)

Next, effects of the present exemplary embodiment will be described.

First effect of the present invention is that a plurality of users are allowed to use the same client environment at separate times or in separate periods of use.

Second effect of the present invention is preventing a user using a client environment from using the same when a set use time or period of use lapses.

Third effect of the present invention is effective use of limited resources (client environments).

Fourth effect of the present invention is improving security by preventing a user from using a client environment at other use time or in other period of use than a set use time or period of use.

Second Exemplary Embodiment

Next, a second exemplary embodiment of the present invention will be detailed with reference to the drawings.

Figure 14:
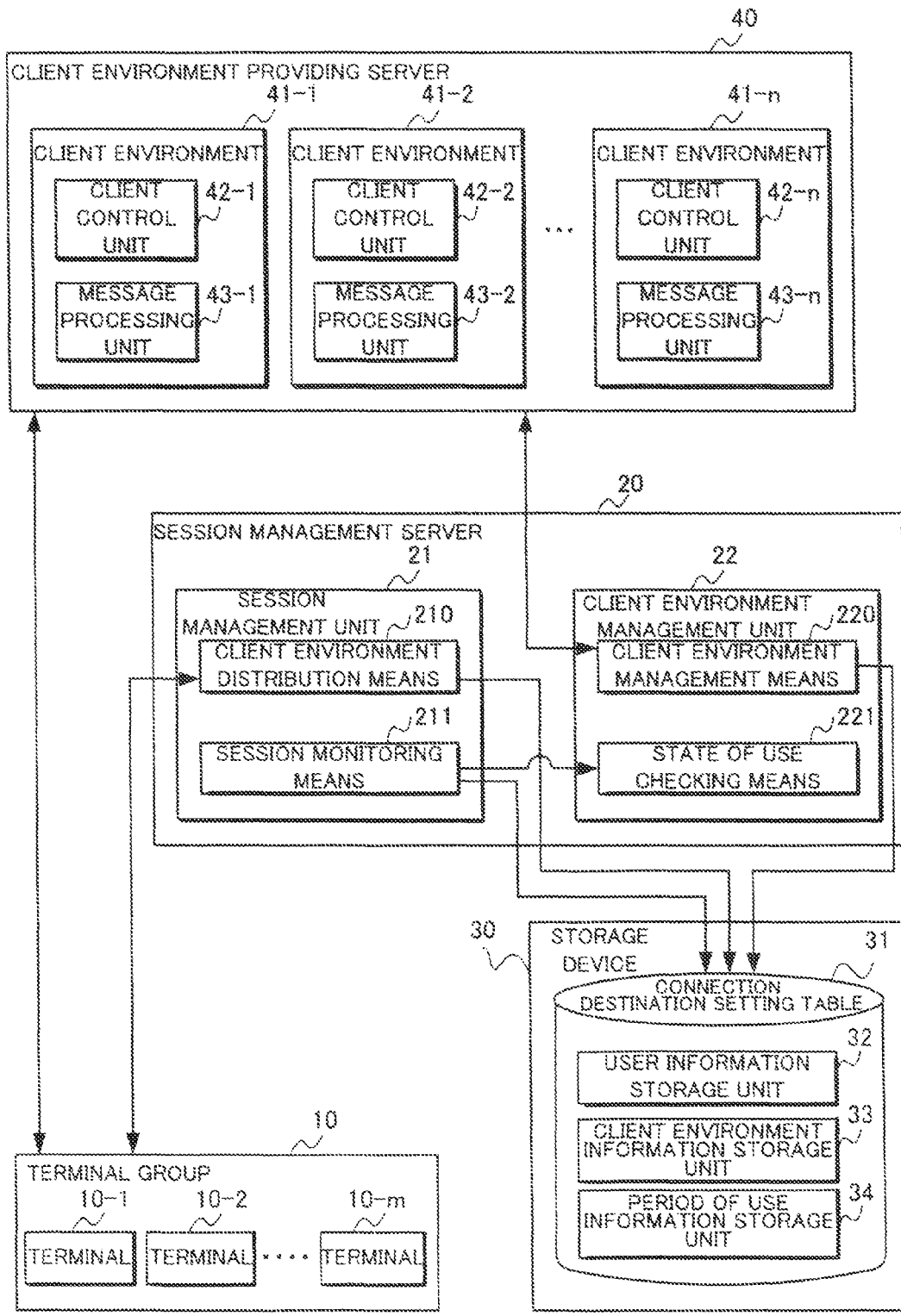
FIG. 14 is a block diagram showing a structure of a session management system according to a second exemplary embodiment of the present invention.

FIG. 14 is a block diagram showing a structure of the session management system 100 according to the present exemplary embodiment and FIG. 15 shows an example of a structure of the connection destination setting table 31 in the present exemplary embodiment.

With reference to FIG. 14, in the session management system 100 according to the present exemplary embodiment, in addition to the components of the first exemplary embodiment shown in FIG. 1, the client environment 41-*n* includes a message processing unit 43-*n*.

With reference to FIG. 15, the connection destination setting table 31 according to the present exemplary embodiment differs from the connection destination setting table 31 of the first exemplary embodiment shown in FIG. 2 in storing an extendable time. Extendable time represents time extendable by a user as use end time of the client environment 42-*n*.

The session monitoring means 211 has a function of requesting the client environment management unit 22 to transmit a request for displaying a warning message (hereinafter referred to as a warning message display request) to a user of the client environment 41-*n*.

The client environment management means 220 includes a function of transmitting, to the client environment providing server 40, a warning message display request to the client environment 41-*n* being used whose use end time falls within a fixed time range from the current time. Warning message display request here includes a use end time.

The client environment management means 220 also has a function of, when an extendable time for a user logging in the client environment 41-*n* is set at the connection destination setting table 31, including the extendable time in the warning message display request.

The client environment management means 220 also has a function of updating information stored in the connection destination setting table 31.

The client environment distribution means 210 has a function of, when a user whose use start time is postponed makes a log-in request before the postponed use start time after the original use start time, transmitting a message that another transmission of a log-in request is required after the postponed use start time.

The message processing units 43-1 to 43-*n* each have a function of displaying a warning message on a screen for a user.

The message processing units 43-1 to 43-*n* each also have a function of inquiring of a user whether a period of use should be extended for a fixed time period or not when a warning message display request includes an extendable time.

Since other structures and functions than those described above are the same as those of the first exemplary embodiment, no description will be here made thereof.

(Description of Operation of the Second Exemplary Embodiment)

Next, operation of the present exemplary embodiment will be detailed with reference to the drawings. Since operation of the present exemplary embodiment is the same as that of the first exemplary embodiment other than operation of postponing a use end time of a client environment, no detailed description will be made thereof.

(Description of Operation of Postponing Use End Time)

Figure 16:
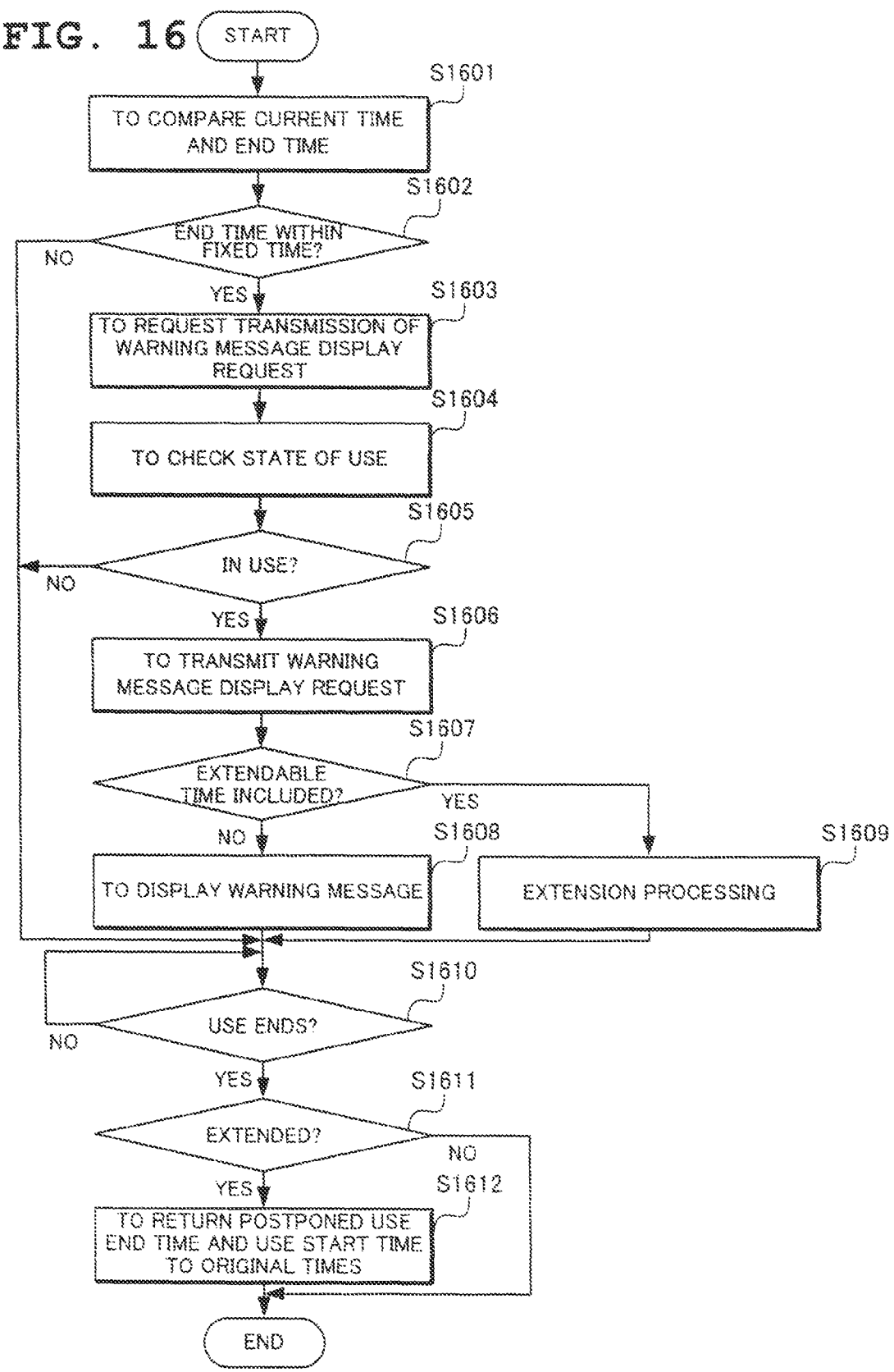
FIG. 16 is a flow chart showing operation of extending a period of time of using a client environment according to the second exemplary embodiment.

Detailed description will be made of operation of postponing use end time of a client environment according to the present exemplary embodiment with reference to FIG. 16. FIG. 16 is a flow chart showing the operation of postponing use end time of a client environment in the session management system 100 according to the present exemplary embodiment.

In the session management server 20, the session monitoring means 211 periodically refers to the connection destination setting table 31 to compare current time and use end time (Step S1601).

Then, when the client environment 41-*n* exists whose use end time is within a fixed time range from the current time ("YES" at Step S1602), the session monitoring means 211 requests the client environment management unit 22 to transmit a warning message display request to a user of the client environment 41-*n* (Step S1603).

In the client environment management unit 22 having received the request, the state of use checking means 221 checks a state of use of the client environment 41-*n* (Step S1604).

Then, when the client environment 41-*n* is in use ("YES" at Step S1605), the client environment management means 220 transmits a warning message display request to the client environment providing server 40 (Step S1606). When an extendable time is set for a user logging in the client environment 41-*n*, include the extendable time in the warning message display request.

Subsequently, the client environment providing server 40 having received the warning message display request transfers the warning message display request to the client environment 41-*n*, so that in the client environment 41-*n* having received the warning message display request, when the warning message display request fails to include an extendable time ("NO" at Step S1607), the message processing unit 43-*n* displays a warning message to the user logging in (Step S1608) and when the warning message display request includes an extendable time ("YES" at Step S1607), executes extension processing (Step S1609).

Figure 17:
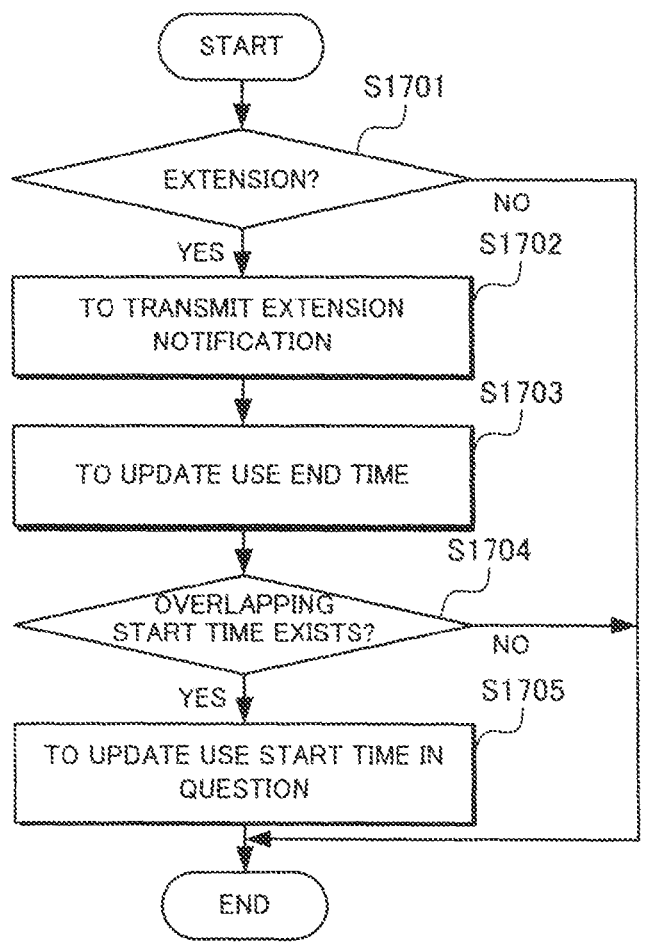
FIG. 17 is a flow chart showing operation of extension processing of a client environment according to the second exemplary embodiment.

Here, detailed description will be made of the extension processing with reference to FIG. 17. FIG. 17 is a flow chart showing operation of the extension processing of a client environment according to the present exemplary embodiment.

With reference to FIG. 17, first the message processing unit 43-*n* inquires of a user whether a period of use should be extended by a fixed time period or not (Step S1701).

When the user selects extension ("YES" at Step S1701), the message processing unit 43-*n* transmits to the session management server 20 a notification of the extension (hereinafter referred to as an extension notification) (Step S1702).

Subsequently, in the session management server 20 having received the extension notification, the client environment management means 220 updates a use end time of the user of the client environment 41-*n* stored in the connection destination setting table 31 (Step S1703).

Subsequently, when there exists a use start time which corresponds to the client environment 41-*n* and overlaps with the above use end time postponed ("YES" at Step S1704), update the use start time in question as well (Step S1705).

When the user whose use start time is postponed makes a log-in request before the postponed use start time after the original use start time, the client environment distribution means 210 notifies the user of a message that another transmission of a log-in request is required after the postponed use start time.

Again with reference to FIG. 16, when in the client environment 41-n, the use of the client environment 41-n is ended by operation of ending the use by the user himself/herself before the use end time lapses or operation of ending the use upon the end of the period of use (Step S1610), the client environment management means 220, if the user has extended his/her period of use ("YES" at Step S1611), returns the postponed use end time and use start time to the original ones (Step S1612).

Since operation itself of ending the use by the user himself/herself before the use end time and operation itself of ending the use upon the end of the extended period of use are the same as those of the first exemplary embodiment, no description will be made thereof.

Second Example

Next, operation of the present exemplary embodiment will be described with respect to a specific example.
(Description of Structure)

Figure 18:
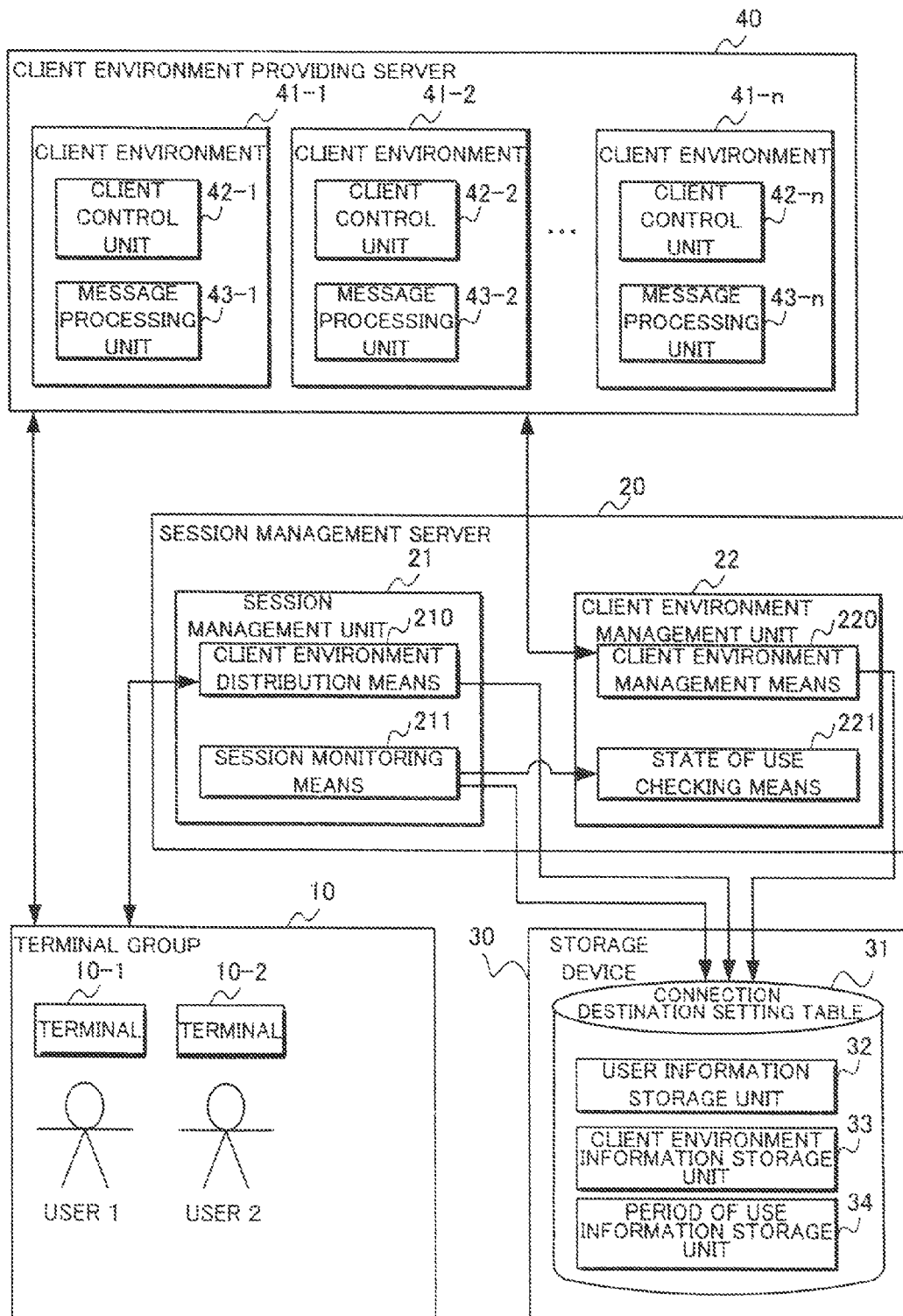
FIG. 18 is a block diagram showing a structure of the session management system according to the second example of the present invention.

FIG. 18 is a block diagram showing a structure of the session management system 100 according to the present example. With reference to FIG. 18, in the present example, the user 1 uses the terminal 10-1 and the user 2 uses the terminal 10-2.

Used in the present example is the connection destination setting table 31 shown in FIG. 15. With reference to FIG. 15, the user 1 is allowed to use the client environment 41-1 from 9:00 to 15:00 and the user 2 is allowed to use the client environment 41-1 from 15:00 to 17:00. In addition, the user 1 is allowed 10-minute extension and the user 2 is not allowed extension.
(Description of Operation)

Next, operation of the present example will be detailed with reference to FIG. 19 through FIG. 23. FIG. 19, FIG. 20, FIG. 22 and FIG. 23 are sequence diagrams showing operation of the present example and FIG. 21 is a diagram showing a structure of the connection destination setting table 31 after extension.

Figure 19:
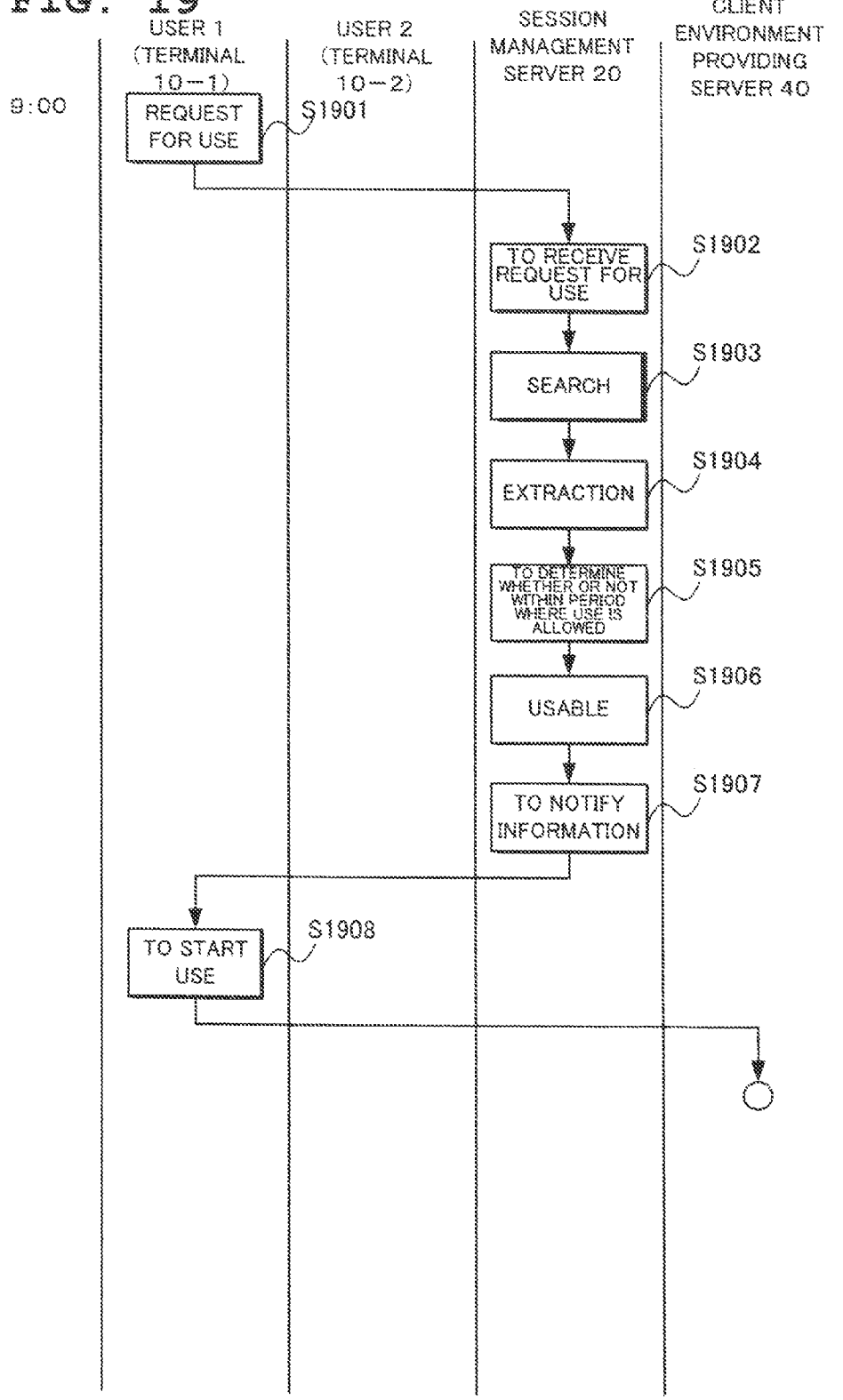
FIG. 19 is a sequence diagram showing operation of the session management system according to the second example.

First, with reference to FIG. 19, when the user 1 executes client environment use requesting operation by the terminal 10-1 at 9:00, the terminal 10-1 transmits a client environment use request to the session management server 20 (Step S1901).

Upon receiving the request for use (Step S1902), the session management server transfers the request for use to the session management unit 21. In the session management unit 21 having received the request for use, first, the client environment distribution means 210 refers to the connection destination setting table 31 with user identification information included in the use request as a key to search for a registered client environment set for the user 1 (Step S1903). As a result, the client environment 41-1 is extracted (Step S1904).

Subsequently, the client environment distribution means 210 compares current time and a period of use set as a period in which the user 1 is allowed to use the client environment 41-1 to determine whether the client environment 41-1 falls within the period where its use is allowed (Step S1905). Since in the present example, the current time is 9:00 o'clock and the period of use stored is from 9:00 to 15:00, the client environment distribution means 210 determines that the client environment 41-1 is usable (Step S1906).

Subsequently, the client environment distribution means 210 notifies the terminal 10-1 of information (IP address A) about the client environment 41-1 (Step S1907).

Subsequently, the terminal 10-1 having received the information of the client environment 41-1 connects to the client environment 41-1 based on the information to start use (Step S1908). Thus, the user 1 is allowed to use the client environment 41-1.

Figure 20:
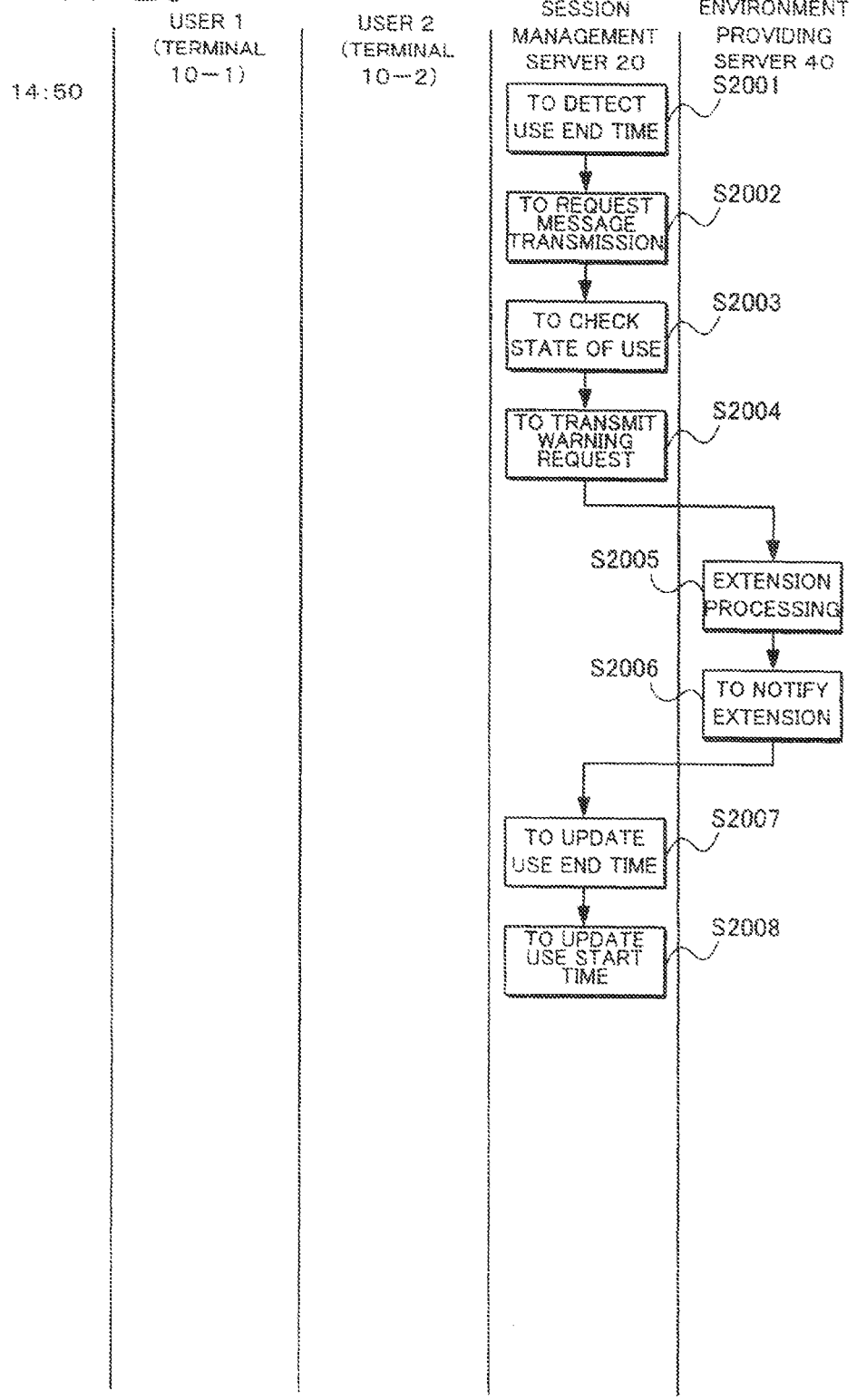
FIG. 20 is a sequence diagram showing operation of the session management system according to the second example.

Next, with reference to FIG. 20, the session monitoring means 211 periodically comparing current time and use end time detects at 14:50 the current time being 10 minutes before the use end time of the client environment 41-1 of the user 1 (Step S2001) to request the client environment management unit 22 for transmission of a warning message display request to the user 1 using the client environment 41-1 (Step S2002). Although the present example is here premised on that time of the detection in question is 14:50 and a fixed time period before the use end time is 10 minutes for convenience of explanation, they are by way of example only.

In the client environment management unit 22 having received the use stop request, the state of use checking means 221 checks a state of use of the client environment 41-1 (Step S2003). Since the user 1 is currently using the client environment 41-1, the client environment management means 220 transmits a warning message display request to the client environment providing server 40 (Step S2004). Since the user 1 is allowed ten-minute extension, the extendable time in question is included in the warning message display request.

Subsequently, the client environment providing server 40 having received the warning message display request transfers the warning message display request to the client environment 41-1, so that in the client environment 41-1 having received the warning message display request, extension processing is executed because the warning message display request includes the extendable time (Step S2005).

In this example, description will be made in the following assuming here that the user 1 selects extension in the above-described extension processing in the present example. Since details of the extension processing are the same as the operation shown in FIG. 17, no details will be made thereof.

When the user 1 selects extension, the message processing unit 43-1 transmits an extension notification to the session management server 20 (Step S2006).

Subsequently, in the session management server 20 having received the extension notification, the client environment management means 220 updates the use end time of the client environment 41-1 of the user 1 stored in the connection destination setting table 31 (Step S2007).

In addition, since the postponed use end time of the user 1 (15:10) overlaps the use start time of the client environment 41-1 of the user 2 (15:00), the client environment management means 220 similarly updates the use start time of the client environment 41-1 of the user 2 (Step S2008).

Shown here in FIG. 21 is the structure of the connection destination setting table 31 as of after the update at Steps S2008 and S2009.

Since the use end time of the client environment 41-1 of the user 1 is thereafter postponed to 15:10, the session monitoring means 211 refrains from making a request for stopping use of the client environment 41-1 to the client environment management unit 22 even when it is 15:00 o'clock.

With reference to FIG. 22, in a case where the user 2 executes operation of requesting client environment use by means of the terminal 10-2 at 15:00, and the terminal 10-1 transmits a client environment use request to the session management server 20 (Step S2201), upon receiving the request for use (Step S2202), the session management server 20 transfers the request for use to the session management unit 21. In the session management unit 21 having received the request for use, first, the client environment distribution means 210 refers to the connection destination setting table 31 with user identification information included in the use request as a key to search for a registered client environment set for the user 1 (Step S2203). As a result, the client environment 41-1 is extracted (Step S2204).

Subsequently, the client environment distribution means 210 compares the current time and a period of use set as a period in which the user 1 is allowed to use the client environment 41-1 to determine whether the client environment 41-1 falls within the period where its use is allowed (Step S2205). Although in the present example, the current time is 8:00 o'clock and the period of use for the user 2 is from 15:00 to 17:00, the start time is postponed 10 minutes to be 15:10, so that determination is made that use is not allowed (Step S2206).

Subsequently, the client environment distribution means 210 notifies the terminal 10-2 that another connection is required after a fixed time period (after 10 minutes) because other user (user 1) extends the period of use of the client environment 41-1 as a registered client environment of the user 2 (Step S2207).

Assuming here that the client environment 41-1 will be used until 15:10, the forced log-out processing starts in the client environment 41-1 at 15:10 and the client environment management means 220 simultaneously returns the postponed use end time of the user 1 and the postponed use start time of the user 2 to original times.

Since the forced log-out processing is the same as the processing shown in FIG. 10, no detailed description will be made thereof. In addition, since the processing of returning postponed use end time and use start time is the same as the processing of Step S1604 shown in FIG. 16, no detailed description will be made thereof.

Figure 23:
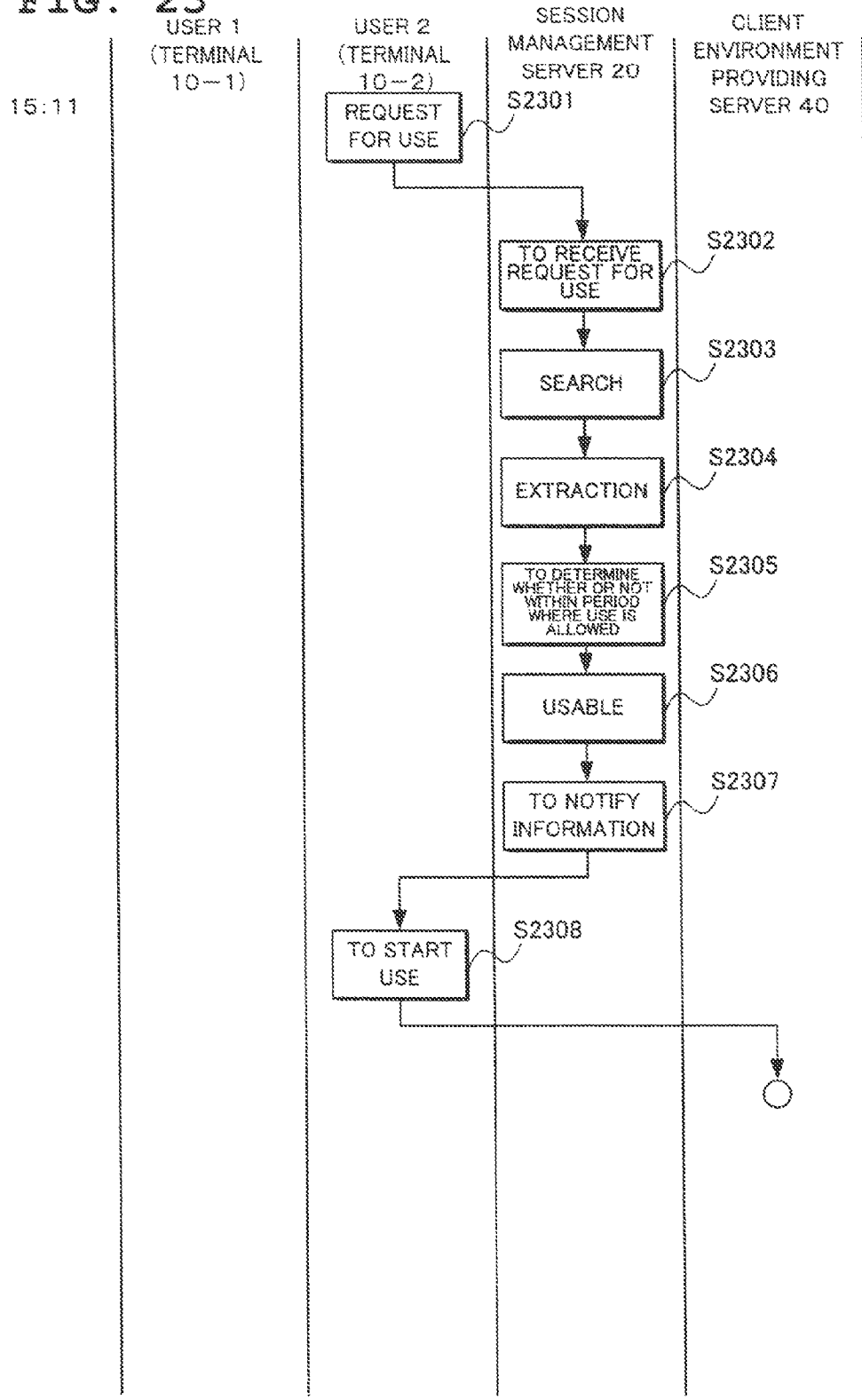
FIG. 23 is a sequence diagram showing operation of the session management system according to the second example.

Next, with reference to FIG. 23, when the user 2 executes operation of requesting use of a client environment by the terminal 10-2 at 15:11, the terminal 10-2 transmits a request for use of a client environment to the session management server 20 (Step S2301).

When receiving the request for use in question (Step S2302), the session management server 20 transfers the request for use to the session management unit 21. In the session management unit 21 having received the request for use, first, the client environment distribution means 210 refers to the connection destination setting table 31 with user identification information included in the request for use as a key to search for a registered client environment set for the user 2 (Step S2303). As a result, the client environment 41-1 is extracted (Step S2304).

Subsequently, the client environment distribution means 210 compares the current time and a period of use set as a period in which the user 2 is allowed to use the client environment 41-1 to determine whether the client environment 41-1 falls within the period where its use is allowed (Step S2305). Since in the present example, the current time is 9:00 o'clock and the period of use stored is from 15:00 to 17:00, the client environment distribution means 210 determines that the client environment 41-1 is usable (Step S2306).

Subsequently, the client environment distribution unit means transmits information (IP address A) of the client environment 41-1 to the terminal 10-2 (Step S2307).

Subsequently, the terminal 10-2 having received the information of the client environment 41-1 connects to the client environment 41-1 based on the information to start use (Step S2308). Thus, the user 2 is allowed to use the client environment 41-1.

Although in the present example, along with the log-out processing executed as the postponed use end time lapses, the postponed use end time and use start time are returned to the original times, it is apparent that even when the user 1 himself/herself logs out before the postponed use end time, the postponed use end time and use start time are returned to the original times upon the log-out as well.

(Effects of the Second Exemplary Embodiment)

Next, effects of the present exemplary embodiment will be described.

According to the present exemplary embodiment, after a lapse of a period of use, not by forcibly preventing use of a client environment but by urging stop of use by the issuance of a warning message before a fixed time period or enabling a period of use to be extended by a fixed time period, convenience for a user can be more improved as compared with the first exemplary embodiment.

Figure 24:
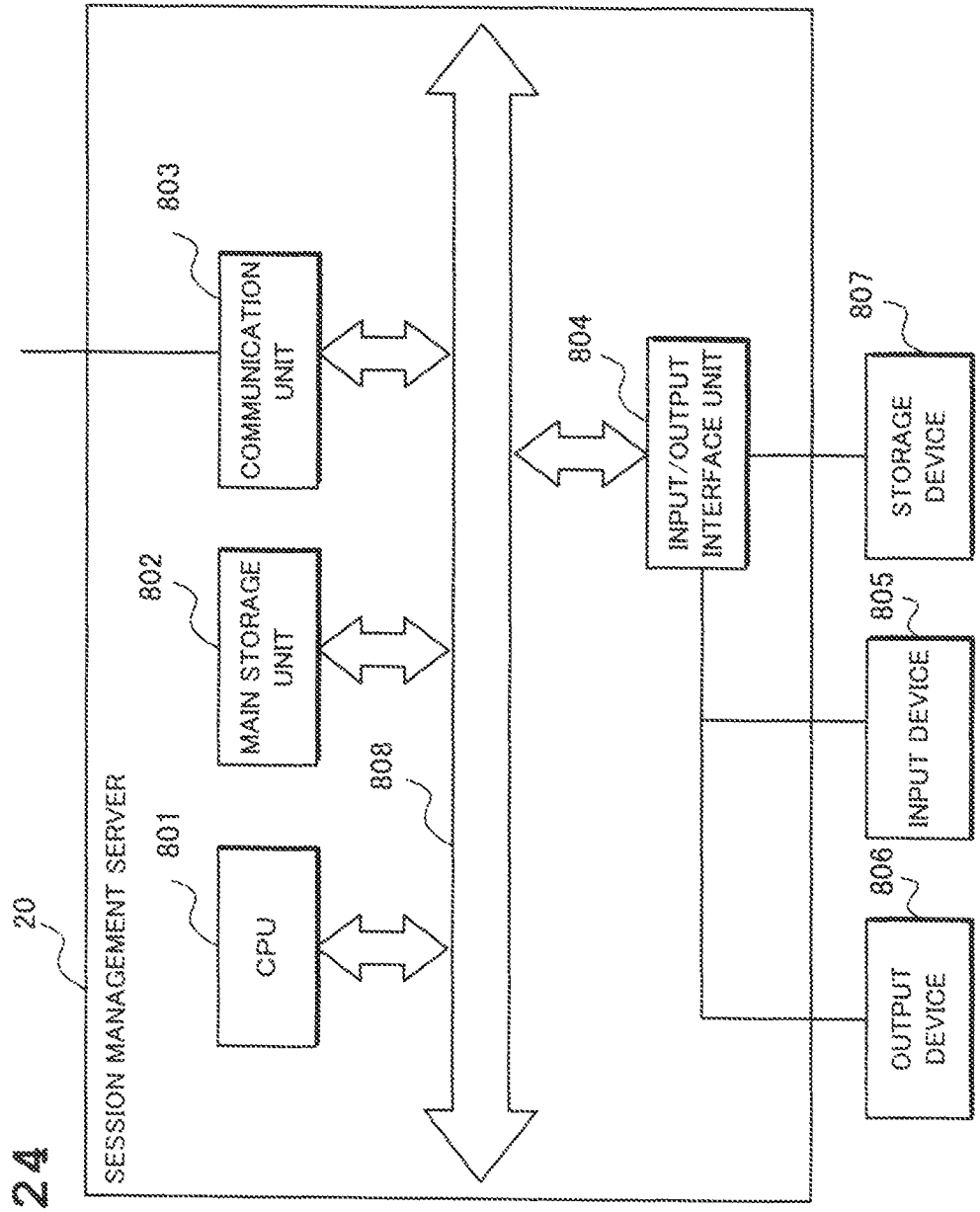
FIG. 24 is a block diagram showing an example of a hardware structure of a test device of the present invention.

Example of a hardware structure of the session management server 20 of the present invention will be described with reference to FIG. 24. FIG. 24 is a block diagram showing an example of the hardware structure of the session management server 20.

With reference to FIG. 24, the session management server 20, which has the same hardware structure as that of a common computer device, comprises a CPU (Central Processing Unit) 801, a main storage unit 802 formed of a memory such as a RAM (Random Access Memory) for use as a data working region or a data temporary saving region, a communication unit 803 which transmits and receives data through a network, an input/output interface unit 804 connected to an input device 805, an output device 806 and a storage device 807 to transmit and receive data, and a system bus 808 which connects each of the above-described components with each other. The storage device 807 is realized by a hard disk device or the like which is formed of a non-volatile memory such as a ROM (Read Only Memory), a magnetic disk or a semiconductor memory.

The session management server 20, the session management unit 21 and the client environment management unit 22 of the present invention have their operation realized not only in hardware by being mounted with a circuit part as a hardware part such as an LSI (Large Scale Integration) with a program incorporated but also in software by storing a program which provides the functions in the storage device 807, loading the program into the main storage unit 802 and executing the same by the CPU 801. The client environment providing server 40 may have such structure as described above to realize each of the above-described functions in hardware or software.

Although the present invention has been described with respect to the preferred exemplary embodiments in the foregoing, such is for illustrative purpose only and it is not to be construed limitative. It will be apparent that modification and variation of the present invention may be made without departing from the scope and spirit of its technical idea.

The whole or part of the exemplary embodiments disclosed above can be described as, but not limited to, the following supplementary notes.

(Supplementary note 1) A session management system including a client environment providing server including at least one client environment, a plurality of terminals, and a session management server which manages a session between said client environment and said terminals, wherein said session management server comprising:
- a session monitoring unit which monitors use end time of said client environment;
- a client environment management unit which makes a log-out request for the execution of log-out processing of a predetermined client environment to said client environment providing server; and
- a state of use checking unit which checks a state of use of each said client environment, wherein
- said session monitoring unit notifying a request for stopping use of said client environment to said state of use checking unit when the use end time of said client environment coincides with current time, and
- said client environment management unit, when said client environment is in use, transmitting to said client environment providing server a log-out request for the execution of the log-out processing of said client environment.

(Supplementary note 2) The session management system according to supplementary note 1, wherein
- said session management server comprises a storage device which stores a connection destination setting table which stores a usable client environment, use start time and use end time so as to be correlated with each other on a user basis, and
- said session monitoring unit refers to said connection destination setting table to compare the current time and the use end time of said client environment.

(Supplementary note 3) The session management system according to supplementary note 1 or supplementary note 2, wherein said client environment providing server includes a client control unit which executes the log-out processing of a predetermined client environment based on the request for the execution of the log-out processing transmitted by said management server.

(Supplementary note 4) The session management system according to any one of supplementary note 1 through supplementary note 3, wherein
- said management server comprises a client environment distribution unit which distributes an appropriate client environment to a user,
- said client environment distribution unit extracting a registered client environment usable by a user of said terminal based on a request for use sent from said terminal and transmitting information about said registered client environment to said terminal, and
- said terminal connects to said registered client environment based on said information.

(Supplementary note 5) The session management system according to supplementary note 4, wherein
- said request for use includes user identification information which enables unique identification of said user, and
- said client environment distribution unit refers to said connection destination setting table with said user identification information as a key and compares time when said registered client environment is usable which is set for said user and the current time to determine whether said registered client environment falls within the period where use of said registered client environment is allowed.

(Supplementary note 6) The session management system according to supplementary note 4 or supplementary note 5, wherein said client environment distribution unit, when there exist a plurality of said registered client environments usable by said user, determines an arbitrary one of the client environments and transmits information of said client environment determined to said terminal.

(Supplementary note 7) The session management system according to any one of supplementary note 1 through supplementary note 4, wherein
- said session monitoring unit refers to said connection destination setting table and compares the current time and the use end time of said client environment to notify to said state of use checking unit a request for transmitting a warning message display request which makes said client environment display a warning message that urges log-out when the use end time of said client environment is within a fixed time range from the current time,
- said state of use checking unit checks a state of use of said client environment, and
- said client environment management unit, when said client environment is in use, transmits said warning message display request to said client environment providing server.

(Supplementary note 8) The session management system according to supplementary note 5, wherein
- said client environment providing server includes a message processing unit which displays said warning message, said message processing unit displaying said warning message in said client environment based on said warning message display request.

(Supplementary note 9) The session management system according to supplementary note 5, wherein
- said connection destination setting table has the function of storing extendable time,
- said client environment management unit transmits said warning message display request with said extendable time included to said client environment providing server when said extendable time is set, and
- said message processing unit inquires of said user whether use time is to be extended when said warning message display request includes said extendable time.

(Supplementary note 10) The session management system according to supplementary note 6, wherein
- said message processing unit transmits an extension notification to said management server when said user selects extension, and
- said client environment management unit extends corresponding use end time based on said extension notification.

(Supplementary note 11) The session management system according to supplementary note 7, wherein said client environment management unit, when said use end time is postponed, if use start time of said client environment of other user who is allowed to use said client environment overlaps with said use end time postponed of said user, postpones the use start time of said other user by extended time.

(Supplementary note 12) The session management system according to supplementary note 7 or supplementary note 11, wherein said client environment management unit, at the time of log-out of said client environment whose use end time is postponed, returns the use end time or use start time changed based on the extension to original time.

(Supplementary note 13) A session management server of a session management system including a client environment providing server including at least one client environment, a plurality of terminals, and a session management server which manages a session between said client environment and said terminals, comprising:
- a session monitoring unit which monitors use end time of said client environment;

a client environment management unit which makes a log-out request for the execution of log-out processing of a predetermined client environment to said client environment providing server; and a state of use checking unit which checks a state of use of each said client environment, wherein said session monitoring unit notifying a request for stopping use of said client environment to said state of use checking unit when the use end time of said client environment coincides with current time, and said client environment management unit, when said client environment is in use, transmitting to said client environment providing server the log-out request for the execution of the log-out processing of said client environment.

(Supplementary note 14) The session management server according to supplementary note 8, comprising:

a storage device which stores a connection destination setting table which stores a usable client environment, use start time and use end time so as to be correlated with each other on a user basis, wherein said session monitoring unit refers to said connection destination setting table to compare the current time and the use end time of said client environment.

(Supplementary note 15) The session management server according to any one of supplementary note 8 or supplementary note 14, wherein said session monitoring unit refers to said connection destination setting table and compares the current time and the use end time of said client environment to notify to said state of use checking unit a request for transmitting a warning message display request which makes said client environment display a warning message that urges log-out when the use end time of said client environment is within a fixed time range from the current time, and said client environment management unit, when said client environment is in use, transmits said warning message display request to said client environment providing server.

(Supplementary note 16) The session management server according to supplementary note 15, wherein said connection destination setting table stores extendable time, and said client environment management unit transmits said warning message display request with said extendable time included to said client environment providing server when said extendable time is set.

(Supplementary note 17) The session management server according to supplementary note 16, wherein said client environment management unit, when said use end time is postponed, if use start time of said client environment of other user who is allowed to use said client environment overlaps with said use end time postponed of said user, postpones the use start time of said other user by extended time.

(Supplementary note 18) The session management server according to supplementary note 16 or supplementary note 17, wherein said client environment management unit, at the time of log-out of said client environment whose use end time is postponed, returns the use end time or use start time changed based on the extension to original time.

(Supplementary note 19) A session management method of a session management system including a client environment providing server including at least one client environment, a plurality of terminals, and a session management server which manages a session between said client environment and said terminals, wherein the session management server including:

a session monitoring step of monitoring use end time of said client environment;

a client environment management step of making a log-out request for the execution of log-out processing of a predetermined client environment to said client environment providing server; and a state of use checking step of checking a state of use of each said client environment, wherein at said session monitoring step, a request for stopping use of said client environment is notified to said state of use checking step when the use end time of said client environment coincides with current time, and at said client environment management step, when said client environment is in use, a log-out request for the execution of the log-out processing of said client environment is transmitted to said client environment providing server.

(Supplementary note 20) The session management method according to supplementary note 9, wherein at said session monitoring step, a connection destination setting table is referred to which stores a usable client environment, use start time and use end time so as to be correlated with each other on a user basis to compare the current time and the use end time of said client environment.

(Supplementary note 21) The session management method according to supplementary note 9 or supplementary note 20, wherein in said client environment providing server, log-out processing of a predetermined client environment is executed based on the request for the execution of the log-out processing transmitted by said management server.

(Supplementary note 22) The session management method according to any one of supplementary note 19, supplementary note 20 and supplementary note 21, wherein said management server includes a client environment distribution step of distributing an appropriate client environment to a user, wherein at said client environment distribution step, a registered client environment usable by a user of said terminal is extracted based on a request for use sent from said terminal to transmit information about said registered client environment to said terminal.

(Supplementary note 23) The session management method according to supplementary note 22, wherein said request for use includes user identification information which enables unique identification of said user, and at said client environment distribution step, said connection destination setting table is referred to with said user identification information as a key to compare time when said registered client environment is usable which is set for said user and the current time and determine whether said registered client environment falls within the period where use of said registered client environment is allowed.

(Supplementary note 24) The session management method according to supplementary note 22 or supplementary note 23, wherein at said client environment distribution step, when there exist a plurality of said registered client environments usable by said user, an arbitrary one of the client environments is determined and information of said client environment determined is transmitted to said terminal.

(Supplementary note 25) The session management method according to any one of supplementary note 19 through supplementary note 24, wherein at said session monitoring step, said connection destination setting table is referred to to compare the current time and the use end time of said client environment and notify to said state of use checking step a request for transmitting a warning message display request which makes said client environment display a warning message that urges log-out when the use end time of said client environment is within a fixed time range from the current time, and at said client environment management step, when said client environment is in use, said warning message display request is transmitted to said client environment providing server.

(Supplementary note 26) The session management method according to supplementary note 25, wherein said client environment providing server includes a message processing step of displaying said warning message, wherein at said message processing step, said warning message is displayed in said client environment based on said warning message display request.

(Supplementary note 27) The session management method according to supplementary note 25 or supplementary note 26, wherein said connection destination setting table has the function of storing extendable time, at said client environment management step, said warning message display request with said extendable time included is transmitted to said client environment providing server when said extendable time is set, and at said message processing step, said user is inquired of whether use time is to be extended when said warning message display request includes said extendable time.

(Supplementary note 28) The session management method according to supplementary note 27, wherein at said message processing step, an extension notification is transmitted to said management server when said user selects extension, and at said client environment management step, corresponding use end time is extended based on said extension notification.

(Supplementary note 29) The session management method according to supplementary note 28, wherein at said client environment management step, when said use end time is postponed, if use start time of said client environment of other user who is allowed to use said client environment overlaps with said use end time postponed of said user, the use start time of said other user is postponed by extended time.

(Supplementary note 30) The session management method according to supplementary note 28 or supplementary note 29, wherein at said client environment management step, at the time of log-out of said client environment whose use end time is postponed, the use end time or use start time changed based on the extension is returned to original time.

(Supplementary note 31) A session management program which causes a session management server of a session management system including a client environment providing server including at least one client environment, a plurality of terminals, and the session management server which manages a session between said client environment and said terminals to execute:

a processing of monitoring use end time of said client environment;

a processing of making a log-out request for the execution of log-out processing of a predetermined client environment to said client environment providing server; and a processing of checking a state of use of each said client environment, wherein in said monitoring processing, a request for stopping use of said client environment is notified to said state of use checking processing when the use end time of said client environment coincides with current time, and in said processing of making the log-out request, when said client environment is in use, the log-out request for the execution of the log-out processing of said client environment is transmitted to said client environment providing server.

INCORPORATION BY REFERENCE

This application is based upon and claims the benefit of priority from Japanese patent application No. 2009-289048, filed on Dec. 21, 2009, the disclosure of which is incorporated herein in its entirety by reference.

What is claimed is:

1. A session management system including a client environment providing server including at least one client environment, a plurality of terminals, and a session management server which manages a session between said client environment and said terminals, wherein said session management server comprises:

a session monitoring unit which monitors use end time of said client environment;

a client environment management unit which makes a log-out request for the execution of log-out processing of a predetermined client environment to said client environment providing server;

a state of use checking unit which checks a state of use of each said client environment; and a storage device which stores a connection destination setting table which stores a usable client environment, use start time, use end time, and extendable time so as to be correlated with each other on a user basis, wherein said session monitoring unit refers to said connection destination setting table and compares the current time and the use end time of said client environment to notify to said state of use checking unit a request for transmitting a warning message display request which makes said client environment display a warning message that urges log-out when the use end time of said client environment is within a fixed time range from the current time, said state of use checking unit checks a state of use of said client environment, said client environment management unit, when said client environment is in use, transmits said warning message display request to said client environment providing server, said client environment management unit transmits said warning message display request with said extendable time included to said client environment providing server when said extendable time is set, a message processing unit of said client environment providing server inquires of said user whether use time is to be extended when said warning message display request includes said extendable time, said message processing unit transmits an extension notification to said management server when said user selects extension, said client environment management unit extends corresponding use end time based on said extension notification, and updates use start time overlapping with the extended use end time to the extended use end time, said session monitoring unit notifies a request for stopping use of said client environment to said state of use checking unit when the use end time of said client environment coincides with current time, and said client environment management unit, when said client environment is in use, transmits to said client environment providing server a log-out request for the execution of the log-out processing of said client environment.

2. The session management system according to claim 1, wherein said session monitoring unit refers to said connection destination setting table to compare the current time and the use end time of said client environment.

3. The session management system according to claim 1, wherein said client environment providing server includes a client control unit which executes the log-out processing of a predetermined client environment based on the request for the execution of the log-out processing transmitted by said management server.

4. The session management system according to claim 1, wherein
said management server comprises a client environment distribution unit which distributes an appropriate client environment to a user,
said client environment distribution unit extracting a registered client environment usable by the user of said terminal based on a request for use sent from said terminal and transmitting information about said registered client environment to said terminal, and
said terminal connects to said registered client environment based on said information.

5. A session management server of a session management system including a client environment providing server including at least one client environment, a plurality of terminals, and a session management server which manages a session between said client environment and said terminals, comprising:
a session monitoring unit which monitors use end time of said client environment;
a client environment management unit which makes a log-out request for the execution of log-out processing of a predetermined client environment to said client environment providing server;
a state of use checking unit which checks a state of use of each said client environment; and
a storage device which stores a connection destination setting table which stores a usable client environment, use start time, use end time, and extendable time so as to be correlated with each other on a user basis, wherein
said session monitoring unit refers to said connection destination setting table and compares the current time and the use end time of said client environment to notify to said state of use checking unit a request for transmitting a warning message display request which makes said client environment display a warning message that urges log-out when the use end time of said client environment is within a fixed time range from the current time,
said state of use checking unit checks a state of use of said client environment,
said client environment management unit, when said client environment is in use, transmits said warning message display request to said client environment providing server,
said client environment management unit transmits said warning message display request with said extendable time included to said client environment providing server when said extendable time is set,
said message processing unit inquires of said user whether use time is to be extended when said warning message display request includes said extendable time,
said message processing unit transmits an extension notification to said management server when said user selects extension,
said client environment management unit extends corresponding use end time based on said extension notification, and updates use start time overlapping with the extended use end time to the extended use end time,
said session monitoring unit notifying notifies a request for stopping use of said client environment to said state of use checking unit when the use end time of said client environment coincides with current time, and
said client environment management unit, when said client environment is in use, transmits to said client environment providing server the log-out request for the execution of the log-out processing of said client environment.

6. A session management method of a session management system including a client environment providing server including at least one client environment, a plurality of terminals, and a session management server which manages a session between said client environment and said terminals, comprising:
at the session management server, a session monitoring step of monitoring use end time of said client environment;
at the session management server, a client environment management step of making a log-out request for the execution of log-out processing of a predetermined client environment to said client environment providing server;
at the session management server, a state of use checking step of checking a state of use of each said client environment; and
at the session management server, a step of storing, on a storage device, a connection destination setting table including a usable client environment, use start time, use end time and extendable time so as to be correlated with each other on a user basis, wherein
said session monitoring step includes referring to said connection destination setting table and comparing the current time and the use end time of said client environment to notify to said state of use checking unit a request for transmitting a warning message display request which makes said client environment display a warning message that urges log-out when the use end time of said client environment is within a fixed time range from the current time,
said state of use checking step includes checking a state of use of said client environment,
said client environment management step includes, when said client environment is in use, transmitting said warning message display request to said client environment providing server,
said client environment management step includes transmitting said warning message display request with said extendable time included to said client environment providing server when said extendable time is set,
at said client environment providing server, a message processing unit inquires of said user whether use time is to be extended when said warning message display request includes said extendable time,
at said client environment providing server, said message processing unit transmits an extension notification to said management server when said user selects extension,
at the session management server, the client environment management step includes a step of extending corresponding use end time based on said extension notification, and updates use start time overlapping with the extended use end time to the extended use end time, at said session monitoring step, a request for stopping use of said client environment is notified to said state of use checking step when the use end time of said client environment coincides with current time, and at said client environment management step, when said client environment is in use, a log-out request for the execution of the log-out processing of said client environment is transmitted to said client environment providing server.

7. A non-transitory computer-readable medium storing a session management program which causes a session management server of a session management system including a client environment providing server including at least one client environment, a plurality of terminals, and the session management server which manages a session between said client environment and said terminals, wherein said session management program causes said session management server to execute:

a session monitoring process that includes monitoring use end time of said client environment;

a client environment management process that includes making a log-out request for the execution of log-out processing of a predetermined client environment to said client environment providing server;

a state of use checking process that includes checking a state of use of each said client environment; and a process of storing, in a storage device, a connection destination setting table which stores a usable client environment, use start time, use end time, and extendable time so as to be correlated with each other on a user basis, wherein said session monitoring process refers to said connection destination setting table and compares the current time and the use end time of said client environment to notify to said state of use checking unit a request for transmitting a warning message display request which makes said client environment display a warning message that urges log-out when the use end time of said client environment is within a fixed time range from the current time, said state of use checking process checks a state of use of said client environment, said client environment management process, when said client environment is in use, transmits said warning message display request to said client environment providing server, said client environment management process transmits said warning message display request with said extendable time included to said client environment providing server when said extendable time is set, a message processing process at said client environment providing server inquires of said user whether use time is to be extended when said warning message display request includes said extendable time, said message processing process transmits an extension notification to said management server when said user selects extension, said client environment management process extends corresponding use end time based on said extension notification, and updates use start time overlapping with the extended use end time to the extended use end time, in said session monitoring process, a request for stopping use of said client environment is notified to said state of use checking processing when the use end time of said client environment coincides with current time, and in said client environment management process, when said client environment is in use, the log-out request for the execution of the log-out processing of said client environment is transmitted to said client environment providing server.

8. The session management system according to claim 2, wherein said client environment providing server includes a client control unit which executes the log-out processing of a predetermined client environment based on the request for the execution of the log-out processing transmitted by said management server.

9. The session management system according to claim 2, wherein said management server comprises a client environment distribution unit which distributes an appropriate client environment to a user, said client environment distribution unit extracting a registered client environment usable by the user of said terminal based on a request for use sent from said terminal and transmitting information about said registered client environment to said terminal, and said terminal connects to said registered client environment based on said information.

10. The session management system according to claim 3, wherein said management server comprises a client environment distribution unit which distributes an appropriate client environment to a user, said client environment distribution unit extracting a registered client environment usable by the user of said terminal based on a request for use sent from said terminal and transmitting information about said registered client environment to said terminal, and said terminal connects to said registered client environment based on said information.

11. The session management system according to claim 8, wherein said management server comprises a client environment distribution unit which distributes an appropriate client environment to a user, said client environment distribution unit extracting a registered client environment usable by the user of said terminal based on a request for use sent from said terminal and transmitting information about said registered client environment to said terminal, and said terminal connects to said registered client environment based on said information.

* * * * *